(12) United States Patent
Schweiger et al.

(10) Patent No.: US 9,506,194 B2
(45) Date of Patent: Nov. 29, 2016

(54) DISPERSION OF CARBON ENHANCED REINFORCEMENT FIBERS IN AQUEOUS OR NON-AQUEOUS MEDIA

(71) Applicant: OCV Intellectual Capital, LLC, Toledo, OH (US)

(72) Inventors: Scott William Schweiger, Newark, OH (US); Stephanie Ann Rinne, Granville, OH (US); Leonard Joseph Adzima, Pickerington, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/424,130

(22) PCT Filed: Sep. 4, 2013

(86) PCT No.: PCT/US2013/057985
§ 371 (c)(1),
(2) Date: Feb. 26, 2015

(87) PCT Pub. No.: WO2014/039509
PCT Pub. Date: Mar. 13, 2014

(65) Prior Publication Data
US 2015/0299956 A1 Oct. 22, 2015

Related U.S. Application Data

(60) Provisional application No. 61/696,500, filed on Sep. 4, 2012, provisional application No. 61/733,672, filed on Dec. 5, 2012.

(51) Int. Cl.
| | | |
|---|---|---|
| *D21H 17/00* | (2006.01) | |
| *D21H 13/50* | (2006.01) | |
| *D21H 15/02* | (2006.01) | |
| *D21H 21/18* | (2006.01) | |
| *C03C 25/26* | (2006.01) | |
| *C03C 25/44* | (2006.01) | |
| *D04H 1/4242* | (2012.01) | |
| *D04H 1/732* | (2012.01) | |

(52) U.S. Cl.
CPC ............ *D21H 17/00* (2013.01); *C03C 25/26* (2013.01); *C03C 25/44* (2013.01); *D04H 1/4242* (2013.01); *D04H 1/732* (2013.01); *D21H 13/50* (2013.01); *D21H 15/02* (2013.01); *D21H 21/18* (2013.01)

(58) Field of Classification Search
CPC ....................................................... D21H 17/00
USPC ........................................................ 162/158
See application file for complete search history.

(56) References Cited

U.S. PATENT DOCUMENTS

| | | |
|---|---|---|
| 5,643,502 A | 7/1997 | Nahass et al. |
| 6,187,426 B1 | 2/2001 | Jonschker et al. |
| 6,265,466 B1 | 7/2001 | Glatkowski et al. |
| 6,308,509 B1 | 10/2001 | Scardino et al. |
| 6,346,189 B1 | 2/2002 | Dai et al. |
| 6,422,450 B1 | 7/2002 | Zhou et al. |
| 6,495,258 B1 | 12/2002 | Chen et al. |
| 6,533,882 B1 | 3/2003 | Woodside |
| 6,607,994 B2 | 8/2003 | Soane et al. |
| 6,726,989 B2 | 4/2004 | Dugan |
| 6,759,025 B2 | 7/2004 | Hong et al. |
| 6,852,410 B2 | 2/2005 | Veedu et al. |
| 6,855,603 B2 | 2/2005 | Choi et al. |
| 6,913,075 B1 | 7/2005 | Knowles et al. |
| 6,934,600 B2 | 8/2005 | Jang et al. |
| 6,939,492 B2 | 9/2005 | Jackson et al. |
| 6,960,334 B1 | 11/2005 | Matsui et al. |
| 6,986,877 B2 | 1/2006 | Takikawa et al. |
| 7,033,650 B2 | 4/2006 | Mauthner et al. |
| 7,048,771 B2 | 5/2006 | Sun et al. |
| 7,078,098 B1 | 7/2006 | Woodside et al. |
| 7,094,386 B2 | 8/2006 | Resasco et al. |
| 7,115,306 B2 | 10/2006 | Jeong et al. |
| 7,132,161 B2 | 11/2006 | Knowles et al. |
| 7,153,452 B2 | 12/2006 | Ogale et al. |
| 7,163,736 B2 | 1/2007 | Takahashi |

(Continued)

FOREIGN PATENT DOCUMENTS

| | | |
|---|---|---|
| CN | 1448335 A | 10/2003 |
| CN | 1618733 A | 5/2005 |
| CN | 1631829 | 6/2005 |
| CN | 1723171 A | 1/2006 |
| CN | 1724343 A | 1/2006 |

(Continued)

OTHER PUBLICATIONS

Carbon Enhanced Reinforcements for Multifunctional Composites; Shah et al; Lockheed Martin-Owens Corning presentation; Nov. 10, 2010 (16 pages).

(Continued)

*Primary Examiner* — Mark Halpern
(74) *Attorney, Agent, or Firm* — Calfee, Halter & Griswold LLP

(57) ABSTRACT

The general inventive concepts relate generally to carbon enhanced reinforcement (CER) fibers, and more particularly, to the controlled dispersion of CER fibers within aqueous or non-aqueous media. The general inventive concepts particularly relate to the controlled dispersion of CER fibers within aqueous or non-aqueous media for forming a nonwoven chopped CER fiber mat. The general inventive concepts also relate to the controlled dispersion of CNSs harvested from CER fibers within aqueous or non-aqueous media for forming a nonwoven CNS mat. Methods for dispersing the CNSs or the CER fibers in aqueous or non-aqueous media are also provided.

14 Claims, 11 Drawing Sheets

(56) References Cited

U.S. PATENT DOCUMENTS

| | | |
|---|---|---|
| 7,169,250 B2 | 1/2007 | Kim et al. |
| 7,195,701 B2 | 3/2007 | Byrd et al. |
| 7,229,944 B2 | 6/2007 | Shao-horn et al. |
| 7,261,779 B2 | 8/2007 | Gardner |
| 7,268,269 B2 | 9/2007 | Axtell et al. |
| 7,270,795 B2 | 9/2007 | Kawakami et al. |
| 7,306,828 B2 | 12/2007 | Barrera et al. |
| 7,335,528 B2 | 2/2008 | Rueckes et al. |
| 7,338,684 B1 | 3/2008 | Curliss et al. |
| 7,384,663 B2 | 6/2008 | Olry et al. |
| 7,390,573 B2 | 6/2008 | Korevaar et al. |
| 7,413,474 B2 | 8/2008 | Liu et al. |
| 7,413,723 B2 | 8/2008 | Niu et al. |
| 7,468,332 B2 | 12/2008 | Avloni |
| 7,473,153 B2 | 1/2009 | Kang et al. |
| 7,501,085 B2 | 3/2009 | Bodaghi |
| 7,517,428 B2 | 4/2009 | Nun et al. |
| 7,528,538 B2 | 5/2009 | Kitamura et al. |
| 7,553,371 B2 | 6/2009 | Dubrow et al. |
| 7,553,781 B2 | 6/2009 | Smith et al. |
| 7,569,161 B2 | 8/2009 | Nagao et al. |
| 7,579,077 B2 | 8/2009 | Dubrow et al. |
| 7,585,484 B2 | 9/2009 | Liu et al. |
| 7,585,584 B2 | 9/2009 | Choi et al. |
| 7,591,915 B2 | 9/2009 | Noguchi et al. |
| 7,601,421 B2 | 10/2009 | Khabashesku et al. |
| 7,601,650 B2 | 10/2009 | Stevens |
| 7,618,599 B2 | 11/2009 | Kim et al. |
| 7,619,029 B1 | 11/2009 | Noguchi et al. |
| 7,628,947 B2 | 12/2009 | Caldoro et al. |
| 7,635,503 B2 | 12/2009 | Dominguez et al. |
| 7,638,195 B2 | 12/2009 | Lichtenhan et al. |
| 7,709,087 B2 | 5/2010 | Majidi et al. |
| 7,713,589 B2 | 5/2010 | Jiang et al. |
| 7,718,220 B2 | 5/2010 | D'Silva et al. |
| 7,731,930 B2 | 6/2010 | Taki et al. |
| 7,754,182 B2 | 7/2010 | Jiang et al. |
| 7,763,353 B2 | 7/2010 | Geohegan et al. |
| 7,776,777 B2 | 8/2010 | Kim et al. |
| 7,780,888 B2 | 8/2010 | Van Der et al. |
| 7,785,558 B2 | 8/2010 | Hikata |
| 7,799,246 B2 | 9/2010 | Bordere et al. |
| 7,799,726 B2 | 9/2010 | Pham-Huu et al. |
| 7,811,632 B2 | 10/2010 | Eres |
| 7,838,459 B2 | 11/2010 | Nagy et al. |
| 7,838,587 B2 | 11/2010 | El Bounia et al. |
| 7,897,209 B2 | 3/2011 | Shibuya et al. |
| 7,897,248 B2 | 3/2011 | Barrera et al. |
| 7,927,701 B2 | 4/2011 | Curliss et al. |
| 7,939,167 B2 | 5/2011 | Kim et al. |
| 7,977,423 B2 | 7/2011 | Koning et al. |
| 7,988,861 B2 | 8/2011 | Pham-Huu et al. |
| 7,988,896 B2 | 8/2011 | Zhang et al. |
| 8,038,908 B2 | 10/2011 | Hirai et al. |
| 8,048,485 B2 | 11/2011 | Shatwell |
| 8,052,951 B2 | 11/2011 | Menchhofer et al. |
| 8,057,778 B2 | 11/2011 | Feng et al. |
| 8,080,487 B2 | 12/2011 | Gardner et al. |
| 8,093,176 B2 | 1/2012 | Buchholz et al. |
| 8,101,150 B2 | 1/2012 | Grill et al. |
| 8,158,217 B2 | 4/2012 | Shah et al. |
| 8,168,291 B2 | 5/2012 | Shah et al. |
| 8,248,305 B2 | 8/2012 | Curran et al. |
| 8,318,308 B2 | 11/2012 | Hata et al. |
| 8,398,949 B2 | 3/2013 | Meyer et al. |
| 8,399,553 B2 | 3/2013 | Koning et al. |
| 8,414,964 B2 | 4/2013 | Ota et al. |
| 8,518,363 B2 | 8/2013 | Noda et al. |
| 8,545,963 B2 | 10/2013 | Alberding et al. |
| 8,580,342 B2 | 11/2013 | Malecki et al. |
| 8,597,587 B2 | 12/2013 | Pirard et al. |
| 8,601,965 B2 | 12/2013 | Shah et al. |
| 8,662,449 B2 | 3/2014 | Shah et al. |
| 8,665,581 B2 | 3/2014 | Fleischer et al. |
| 8,753,602 B2 | 6/2014 | Shanov et al. |
| 8,780,526 B2 | 7/2014 | Fleischer et al. |
| 8,784,937 B2 | 7/2014 | Malet et al. |
| 8,787,001 B2 | 7/2014 | Fleischer et al. |
| 8,845,995 B2 | 9/2014 | Kauppinen et al. |
| 8,920,971 B2 | 12/2014 | Stromme et al. |
| 8,945,434 B2 | 2/2015 | Krause et al. |
| 9,095,639 B2 | 8/2015 | Ajayan et al. |
| 2003/0051458 A1 | 3/2003 | Kim |
| 2005/0005367 A1 | 1/2005 | Xu et al. |
| 2005/0025695 A1 | 2/2005 | Pradhan |
| 2005/0026778 A1 | 2/2005 | Axtell et al. |
| 2005/0184643 A1 | 8/2005 | Cho et al. |
| 2005/0287064 A1 | 12/2005 | Mayne et al. |
| 2006/0008584 A1 | 1/2006 | Park et al. |
| 2006/0058443 A1 | 3/2006 | Ohashi et al. |
| 2006/0062944 A1 | 3/2006 | Gardner et al. |
| 2006/0102462 A1 | 5/2006 | Bourdelais et al. |
| 2006/0121275 A1 | 6/2006 | Poulin et al. |
| 2006/0148349 A1 | 7/2006 | Naor et al. |
| 2006/0198956 A1 | 9/2006 | Eres |
| 2006/0238096 A1 | 10/2006 | Han et al. |
| 2006/0266485 A1 | 11/2006 | Knox et al. |
| 2006/0280938 A1 | 12/2006 | Atkinson |
| 2007/0082197 A1 | 4/2007 | Ko et al. |
| 2007/0128960 A1 | 6/2007 | Ghasemi et al. |
| 2007/0148365 A1 | 6/2007 | Knox et al. |
| 2007/0189953 A1 | 8/2007 | Bai |
| 2007/0218280 A1 | 9/2007 | Yabuki et al. |
| 2007/0286877 A1 | 12/2007 | Axtell et al. |
| 2008/0053831 A1 | 3/2008 | Byrd et al. |
| 2008/0075651 A1 | 3/2008 | Higashi et al. |
| 2008/0075954 A1 | 3/2008 | Wardle et al. |
| 2008/0160286 A1 | 7/2008 | Asrar et al. |
| 2008/0160302 A1 | 7/2008 | Asrar et al. |
| 2008/0170982 A1 | 7/2008 | Zhang et al. |
| 2008/0176470 A1 | 7/2008 | Filip et al. |
| 2008/0182108 A1 | 7/2008 | Curliss et al. |
| 2008/0213498 A1 | 9/2008 | Drzal et al. |
| 2008/0214075 A1 | 9/2008 | Marte et al. |
| 2008/0233298 A1 | 9/2008 | Xu et al. |
| 2008/0244840 A1 | 10/2008 | Raccurt et al. |
| 2008/0247938 A1 | 10/2008 | Tsai et al. |
| 2008/0248230 A1 | 10/2008 | Dewitte et al. |
| 2008/0251971 A1 | 10/2008 | Kim et al. |
| 2008/0280202 A1 | 11/2008 | Yen et al. |
| 2008/0286564 A1 | 11/2008 | Tsotsis |
| 2009/0004552 A1 | 1/2009 | Sun et al. |
| 2009/0017301 A1 | 1/2009 | Moireau |
| 2009/0035473 A1 | 2/2009 | Jaworowski et al. |
| 2009/0045195 A1 | 2/2009 | Djerf et al. |
| 2009/0047453 A1 | 2/2009 | Folaron et al. |
| 2009/0047502 A1 | 2/2009 | Folaron et al. |
| 2009/0068461 A1 | 3/2009 | Reneker et al. |
| 2009/0076195 A1 | 3/2009 | Nodera et al. |
| 2009/0081383 A1 | 3/2009 | Alberding et al. |
| 2009/0081441 A1 | 3/2009 | Shah et al. |
| 2009/0084600 A1 | 4/2009 | Severance |
| 2009/0092832 A1 | 4/2009 | Moireau |
| 2009/0121196 A1 | 5/2009 | El Bounia |
| 2009/0121613 A1 | 5/2009 | Taki et al. |
| 2009/0136707 A1 | 5/2009 | Ueno |
| 2009/0148637 A1 | 6/2009 | Zhang et al. |
| 2009/0148760 A1 | 6/2009 | Justice |
| 2009/0159228 A1* | 6/2009 | Law ............... C03C 25/328 162/157.4 |
| 2009/0176100 A1 | 7/2009 | Higashi et al. |
| 2009/0186214 A1 | 7/2009 | Lafdi et al. |
| 2009/0217812 A1 | 9/2009 | Whitaker et al. |
| 2009/0220409 A1 | 9/2009 | Curliss et al. |
| 2009/0221201 A1 | 9/2009 | Carter et al. |
| 2009/0229760 A1 | 9/2009 | Hamlyn et al. |
| 2009/0272935 A1 | 11/2009 | Hata et al. |
| 2009/0311166 A1 | 12/2009 | Hart et al. |
| 2009/0321687 A1 | 12/2009 | Kim et al. |
| 2010/0009160 A1 | 1/2010 | Noguchi et al. |
| 2010/0009204 A1 | 1/2010 | Noguchi et al. |
| 2010/0010186 A1 | 1/2010 | Taniguchi et al. |
| 2010/0021682 A1 | 1/2010 | Liang et al. |
| 2010/0024975 A1 | 2/2010 | Hecht |

(56) References Cited

U.S. PATENT DOCUMENTS

| | | |
|---|---|---|
| 2010/0029475 A1 | 2/2010 | Pradhan |
| 2010/0032629 A1 | 2/2010 | Brule et al. |
| 2010/0038602 A1 | 2/2010 | Plee |
| 2010/0040887 A1 | 2/2010 | Han et al. |
| 2010/0074834 A1 | 3/2010 | Kim |
| 2010/0077823 A1 | 4/2010 | Champion et al. |
| 2010/0080978 A1 | 4/2010 | Jerome et al. |
| 2010/0081351 A1 | 4/2010 | Hong et al. |
| 2010/0084616 A1 | 4/2010 | Brule et al. |
| 2010/0098113 A1 | 4/2010 | Nicholson |
| 2010/0098931 A1 | 4/2010 | Daniel et al. |
| 2010/0104868 A1 | 4/2010 | Lee et al. |
| 2010/0120969 A1 | 5/2010 | Tsotsis |
| 2010/0126134 A1 | 5/2010 | Atkinson et al. |
| 2010/0143701 A1 | 6/2010 | Zhu et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1* | 8/2010 | Shah .................. B82Y 30/00 118/620 |
| 2010/0196250 A1 | 8/2010 | Derre et al. |
| 2010/0196697 A1 | 8/2010 | D'Silva et al. |
| 2010/0200800 A1 | 8/2010 | Fujimura et al. |
| 2010/0206504 A1 | 8/2010 | Akiyama et al. |
| 2010/0210159 A1 | 8/2010 | Zhu |
| 2010/0210781 A1 | 8/2010 | McAndrew et al. |
| 2010/0221424 A1 | 9/2010 | Malecki et al. |
| 2010/0224129 A1 | 9/2010 | Malecki et al. |
| 2010/0226848 A1 | 9/2010 | Nakayama et al. |
| 2010/0227058 A1 | 9/2010 | Zhang et al. |
| 2010/0227134 A1 | 9/2010 | Shah et al. |
| 2010/0227153 A1 | 9/2010 | Okoli et al. |
| 2010/0233366 A1 | 9/2010 | Fukushima et al. |
| 2010/0254885 A1 | 10/2010 | Menchhofer et al. |
| 2010/0258111 A1 | 10/2010 | Shah et al. |
| 2010/0259752 A1 | 10/2010 | Shah et al. |
| 2010/0260931 A1 | 10/2010 | Malecki et al. |
| 2010/0260933 A1 | 10/2010 | Malecki et al. |
| 2010/0260998 A1 | 10/2010 | Waicukauski et al. |
| 2010/0270069 A1* | 10/2010 | Shar .................. H01B 1/18 174/377 |
| 2010/0271253 A1 | 10/2010 | Shah et al. |
| 2010/0272891 A1 | 10/2010 | Malecki et al. |
| 2010/0276072 A1 | 11/2010 | Shah et al. |
| 2010/0279010 A1 | 11/2010 | Malecki et al. |
| 2010/0279569 A1 | 11/2010 | Shah et al. |
| 2010/0282668 A1 | 11/2010 | Cooper et al. |
| 2010/0285972 A1 | 11/2010 | Dubrow et al. |
| 2010/0291297 A1 | 11/2010 | Nagasaka et al. |
| 2010/0296996 A1 | 11/2010 | Ohta et al. |
| 2010/0297441 A1 | 11/2010 | Zhu |
| 2010/0305298 A1 | 12/2010 | Kim et al. |
| 2010/0310851 A1 | 12/2010 | Lai et al. |
| 2011/0024409 A1 | 2/2011 | Shah et al. |
| 2011/0024694 A1* | 2/2011 | Shah .................. C08J 5/042 252/502 |
| 2011/0028308 A1* | 2/2011 | Shah .................. B01J 23/745 502/159 |
| 2011/0089365 A1 | 4/2011 | Oriji et al. |
| 2011/0089958 A1 | 4/2011 | Malecki et al. |
| 2011/0123735 A1 | 5/2011 | Shah et al. |
| 2011/0124253 A1 | 5/2011 | Shah et al. |
| 2011/0132245 A1 | 6/2011 | Shah et al. |
| 2011/0133031 A1 | 6/2011 | Shah et al. |
| 2011/0135491 A1 | 6/2011 | Shah et al. |
| 2011/0143087 A1 | 6/2011 | Alberding et al. |
| 2011/0151254 A1 | 6/2011 | Fugetsu et al. |
| 2011/0168083 A1 | 7/2011 | Shah et al. |
| 2011/0168089 A1 | 7/2011 | Shah et al. |
| 2011/0168957 A1 | 7/2011 | Lonjon et al. |
| 2011/0171469 A1 | 7/2011 | Shah et al. |
| 2011/0174519 A1 | 7/2011 | Shah et al. |
| 2011/0180478 A1 | 7/2011 | Shah et al. |
| 2011/0186775 A1 | 8/2011 | Shah et al. |
| 2011/0204296 A1 | 8/2011 | Conzen et al. |
| 2011/0216476 A1 | 9/2011 | Fleischer et al. |
| 2011/0217618 A1 | 9/2011 | Liu et al. |
| 2011/0242731 A1 | 10/2011 | Fleischer et al. |
| 2011/0297892 A1 | 12/2011 | Shah et al. |
| 2011/0304964 A1 | 12/2011 | Fleischer et al. |
| 2011/0311724 A1 | 12/2011 | Jensen et al. |
| 2011/0311811 A1 | 12/2011 | Collette et al. |
| 2012/0000691 A1 | 1/2012 | Shah et al. |
| 2012/0052363 A1 | 3/2012 | Fleischer |
| 2012/0058296 A1 | 3/2012 | Shah et al. |
| 2012/0058352 A1 | 3/2012 | Shah et al. |
| 2012/0058889 A1 | 3/2012 | Nishino et al. |
| 2012/0064332 A1 | 3/2012 | Malet et al. |
| 2012/0065300 A1 | 3/2012 | Shah et al. |
| 2012/0070667 A1 | 3/2012 | Malet et al. |
| 2012/0073568 A1 | 3/2012 | Kapelanczyk et al. |
| 2012/0107221 A1 | 5/2012 | Bai |
| 2012/0112133 A1 | 5/2012 | Bahnmuller et al. |
| 2012/0112134 A1 | 5/2012 | Jung et al. |
| 2012/0141880 A1 | 6/2012 | Burgess et al. |
| 2012/0149824 A1 | 6/2012 | Hocke et al. |
| 2012/0160966 A1 | 6/2012 | Shah et al. |
| 2012/0164429 A1 | 6/2012 | Shah et al. |
| 2012/0189846 A1 | 7/2012 | Shah et al. |
| 2012/0237680 A1 | 9/2012 | Brahim et al. |
| 2012/0247800 A1 | 10/2012 | Shah et al. |
| 2012/0263935 A1 | 10/2012 | Ledford et al. |
| 2013/0071565 A1 | 3/2013 | Malecki et al. |
| 2013/0101495 A1 | 4/2013 | Peterson et al. |
| 2013/0143087 A1 | 6/2013 | Liu et al. |
| 2013/0236631 A1 | 9/2013 | Malecki et al. |
| 2014/0009599 A1 | 1/2014 | Ledford et al. |
| 2014/0065447 A1 | 3/2014 | Liu et al. |
| 2014/0093728 A1 | 4/2014 | Shah et al. |
| 2014/0094541 A1 | 4/2014 | Shah et al. |
| 2014/0097917 A1 | 4/2014 | Shah et al. |
| 2014/0099493 A1 | 4/2014 | Liu et al. |
| 2014/0151111 A1 | 6/2014 | Shah et al. |
| 2014/0154412 A1 | 6/2014 | Malecki et al. |
| 2014/0295098 A1 | 10/2014 | Shanov et al. |

FOREIGN PATENT DOCUMENTS

| | | |
|---|---|---|
| CN | 1868867 A | 11/2006 |
| CN | 1877774 A | 12/2006 |
| CN | 11070250 | 11/2007 |
| CN | 101270470 A | 9/2008 |
| CN | 101283027 A | 10/2008 |
| CN | 101289329 A | 10/2008 |
| CN | 101304650 A | 11/2008 |
| CN | 11314649 | 12/2008 |
| CN | 11350412 | 1/2009 |
| CN | 101381080 A | 3/2009 |
| CN | 11412592 | 4/2009 |
| CN | 101407587 A | 4/2009 |
| CN | 101409999 A | 4/2009 |
| CN | 21304296 | 9/2009 |
| CN | 101608066 A | 12/2009 |
| CN | 11698975 | 4/2010 |
| CN | 101723349 A | 6/2010 |
| CN | 101853727 A | 10/2010 |
| CN | 101856614 A | 10/2010 |
| CN | 101955648 A | 1/2011 |
| CN | 101974179 A | 2/2011 |
| CN | 102110489 A | 6/2011 |
| CN | 102115580 A | 7/2011 |
| CN | 102333645 | 1/2012 |
| CN | 102461361 | 5/2012 |
| CN | 102470546 | 5/2012 |
| DE | 102005023764 A1 | 11/2006 |
| DE | 102008045742 A1 | 3/2010 |
| EP | 1331202 A2 | 7/2003 |
| EP | 1930364 A1 | 6/2008 |
| EP | 2000495 A1 | 12/2008 |
| GB | 2469728 | 8/2010 |
| IN | 05018131 | 3/2007 |
| IN | 05030631 | 8/2007 |
| IN | 404/DEL/2007 | 9/2008 |
| IN | 08019001 | 3/2010 |

(56) References Cited

FOREIGN PATENT DOCUMENTS

| | | |
|---|---|---|
| IN | 3325/MUM/2010 | 3/2011 |
| IN | 262323 | 8/2014 |
| IN | 267207 | 7/2015 |
| JP | 2005256221 | 9/2005 |
| JP | 2005256222 | 9/2005 |
| JP | 2005264400 | 9/2005 |
| JP | 2008112163 | 5/2008 |
| JP | 2009067663 | 4/2009 |
| JP | 2010059561 | 3/2010 |
| KR | 20007014484 | 8/2001 |
| KR | 20020005325 A | 1/2002 |
| KR | 20017011150 | 3/2002 |
| KR | 100372332 B1 | 2/2003 |
| KR | 20030019527 A | 3/2003 |
| KR | 100385867 B1 | 6/2003 |
| KR | 20030013041 | 9/2004 |
| KR | 100490472 B1 | 5/2005 |
| KR | 1020050002864 A | 10/2005 |
| KR | 20040056953 | 1/2006 |
| KR | 100665676 B1 | 1/2007 |
| KR | 100744517 B1 | 4/2007 |
| KR | 20070096299 A | 10/2007 |
| KR | 100792782 B1 | 1/2008 |
| KR | 0829001 | 5/2008 |
| KR | 20080047015 A | 5/2008 |
| KR | 1020080039227 A | 5/2008 |
| KR | 9104210 | 10/2009 |
| KR | 20090124277 A | 12/2009 |
| KR | 20100019821 A | 2/2010 |
| KR | 20100034238 A | 4/2010 |
| KR | 100973053 B1 | 7/2010 |
| KR | 20100133075 A | 12/2010 |
| KR | 20110035402 A | 4/2011 |
| KR | 20110016725 | 10/2011 |
| KR | 20110115954 A2 | 10/2011 |
| KR | 20100059133 | 12/2011 |
| TW | 200711995 | 4/2007 |
| TW | 200730245 | 8/2007 |
| TW | 200808651 | 2/2008 |
| TW | 200828344 A | 7/2008 |
| TW | 0833409 | 8/2008 |
| TW | 0833861 | 8/2008 |
| TW | 200833409 | 8/2008 |
| TW | 200846287 A | 12/2008 |
| TW | 200911920 A | 3/2009 |
| TW | 200927690 A | 7/2009 |
| TW | 200938373 A | 9/2009 |
| TW | 200947466 A | 11/2009 |
| TW | 201011379 A | 3/2010 |
| TW | 201012171 A | 3/2010 |
| WO | 98/11299 | 3/1998 |
| WO | 2006115486 A1 | 11/2006 |
| WO | 2008065121 A1 | 6/2008 |
| WO | 2008070482 | 6/2008 |
| WO | 2008070926 A1 | 6/2008 |
| WO | 2009110885 | 9/2009 |
| WO | 2010007163 | 1/2010 |
| WO | 2010106152 | 9/2010 |

OTHER PUBLICATIONS

Carbon Enhanced Reinforcements (CER) for EMI Shielding Applications; Owens Corning; Oct. 2011 (16 pages).
Carbon Enhanced Reinforcements Electrical, Thermal and Mechanical Composite Performance; Hartman et al; Applied Nanostructured Solutions LLC—Owens Corning presentation; Feb. 2012 (32 pages).
Composite Solutions—Multifunctional Composites—Electrical, Thermal and Mechanical Behavior; JEC 2012 Conference; Mar. 2012 (21 pages).
Composite Solutions—Carbon Enhanced Reinforcements (CER); Owens Corning Customer Presentation; Mar. 16, 2012 (10 pages).
Composite Solutions—Carbon Enhanced Reinforcements (CER); Owens Corning Customer Presentation; Mar. 23, 2012 (12 pages).
Composite Solutions—Multifunctional Compounds Using Carbon Nanostructure Enhanced Glass Reinforcements in Electromagnetic Compatibility Applications; VanHouten et al.; ANTEC presentation; Apr. 2, 2012 (18 pages).
Carbon Nanostructure Enhanced Reinforcements in Electromagnetic Compatibility Applications; Hartman et al; Aug. 2012 (6 pages).
Nanotechnology: Into the realm of real; Case study from High-Performance Composites May 2011, Sara Black; Posted May 2, 2011 (3 pages).
Effect of the Growth Tamperature on the Diameter Distribution and Chirality of Single-Wall Carbon Nanotubes; Bandow et al; Physical Review Letters; 1998 The American Physical Society (4 pages).
Alignment of carbon nanotubes in a polymer matrix by mechanical stretching; Jin et al; Applied Physics Letters, vol. 73, No. 9; Aug. 31, 1998; 1998 American Institute of Physics (3 pages).
Diameter control and emission properties of carbon nanotubes grown using chemical vapor deposition; Kaatz et al; Materials Science & Engineering C23 (2008) (4 pages).
Growth mechanisms and diameter evolution of single wall carbon nanotubes; Alverez et al; Chemical Physics Letters 342 (2001) 7-14 (8 pages).
Large-Scale Synthesis of Aligned Carbon Nanotubes; Li et al; Science, vol. 274, Dec. 6, 1996 (3 pages).
A novel method of varying the diameter of carbon nanotubes formed on an Fe-supported Y zeolite catalyst; Zhang et al; Microporous and Mesoporous Materials 29 (1999) 383-388 (6 pages).
Carbon Enhanced Reinforcements for Multifunctional Composites; Owens Corning/Lockheed Martin presentation; 2010 (15 pages).
Diameter control of single-walled carbon nanotubes; Kataura et al; Carbon 38 (2000) 1691-1697) (7 pages).
Diameter-controlled synthesis of carbon nanotubes; Cheung et al; J. Phys. Chem B 2002 (5 pages).
Raman spectroscopy and imaging of ultralong carbon nanotubes; Doorn et al; J. Phys. Chem. B 2005 (8 pages).
Theoretical study of the stabiity of defects in single-walled carbon nanotubes as a function of their distance from the nanotube end; Ding; Physical Review B 72. 245409 (2005); published Dec. 7, 2005 (7 pages).
Nanoscale electronic devices on carbon nanotubes; Collins et al; Nanotechnology 9 (1998) (11 pages).
A review of vapor grown carbon nanofiber/polymer conductive composites; Al-Saleh et al; Science Direct; (21 pages).
Carbon nanofiber; Wikipedia (4 pages).
Office action from Chinese Application No. 201380053995.1 dated Aug. 10, 2016.

* cited by examiner

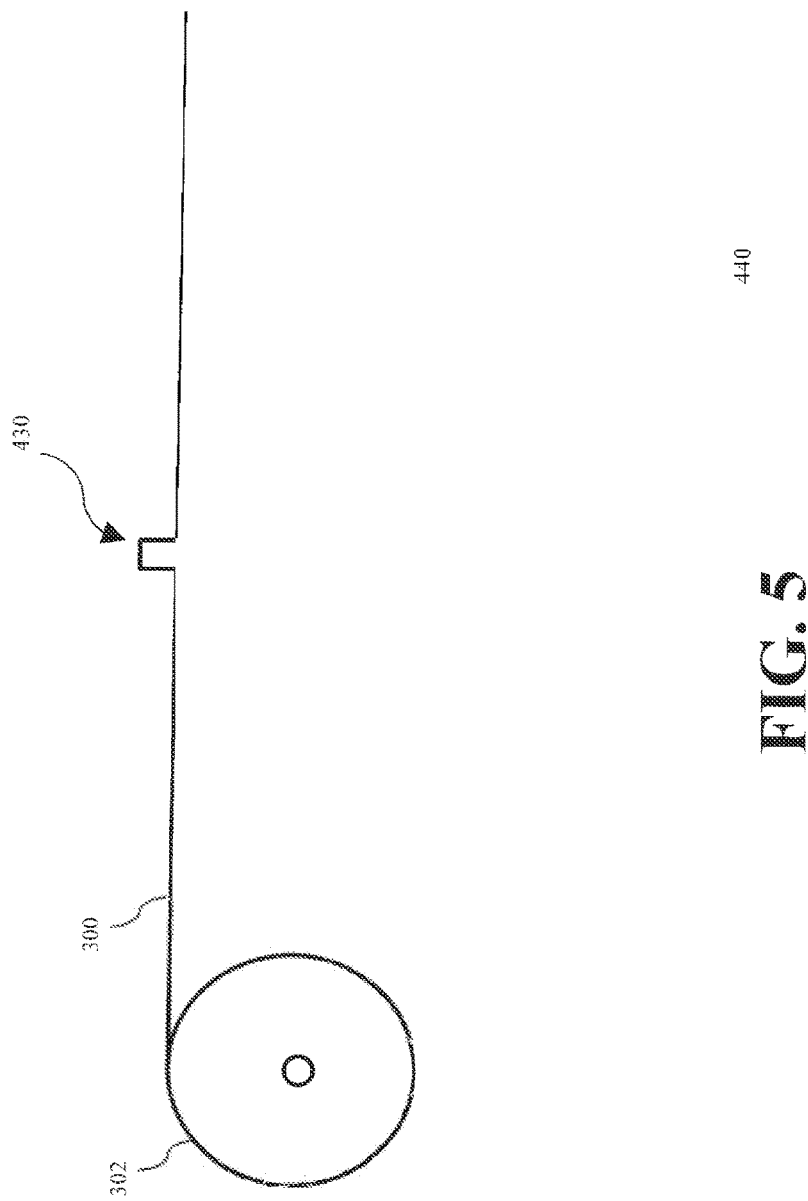

DISPERSION OF CARBON ENHANCED REINFORCEMENT FIBERS IN AQUEOUS OR NON-AQUEOUS MEDIA

This application is 371 of PCT/US2013/057985 filed 4 Sep. 2013

The present application claims priority to U.S. Provisional Application No. 61/696,500 filed Sep. 4, 2012 and U.S. Provisional Application No. 61/733,672 filed Dec. 5, 2012, which are hereby incorporated by reference in their entireties.

FIELD

The general inventive concepts relate generally to carbon nanostructures (CNSs) and carbon enhanced reinforcement (CER) fibers, and more particularly, to the controlled dispersion of CNSs or CER fibers within aqueous or non-aqueous media. The general inventive concepts particularly relate to the controlled dispersion of CNSs or CER fibers within aqueous or non-aqueous media for forming a nonwoven CNS or chopped CER fiber mat. A method for dispersing the CNSs or CER fibers in aqueous or non-aqueous media is also provided.

BACKGROUND

Carbon nanostructures (CNSs) include carbon nanomaterials, such as carbon nanotubes, for example, that have unique properties that position them for a wide scope of possible applications. CNSs are fullerene-related structures of graphite cylinders with unique atomic structures that provide high mechanical properties, namely tensile strength and elastic modulus, excellent thermal and electrical conductivities, and high aspect ratios. One group of CNSs are carbon nanotubes ("CNTs"), which are generally un-branched and may comprise single walled carbon nanotubes (SWCNTs), double walled carbon nanotubes (DW-CNTs), and multi-walled carbon nanotubes (MWCNTs).

The unique structure and properties of CNSs causes them to be useful in a variety of applications, including electrically conductive polymeric composites finding use in automotive applications, aerospace applications, battery applications, thermal management applications, electromagnetic interference (EMI) shielding applications, and many other applications.

CNSs exhibit strong van der Waals forces that attract individual CNSs to one another, causing the CNSs to aggregate into bundles, aggregates, or groupings, making dispersion of the CNSs difficult. Accordingly, there exists a need in the art for a method for improving and controlling the dispersion of CNSs and CER fibers in a medium. For example, it is desirable to control the dispersion of CER fibers to provide nonwoven chopped CER fiber mats with maximized structural, thermal, and electrical properties.

SUMMARY OF THE INVENTION

The general inventive concepts include a method for controlling the dispersion of CNSs or carbon enhanced reinforcement ("CER") fibers in aqueous or non-aqueous media. The method includes incorporating CNSs or chopped CER fibers into a whitewater solution that may include one or more of a viscosity modifier, dispersion medium, binder, a biocide, and a defoaming agent.

In some exemplary embodiments, the CER fibers consist of a plurality of carbon nanostructures grown in situ on a fiber. CNSs exhibit strong van der Waals forces that attract individual CNSs to one another, causing the CNSs to aggregate into bundles, aggregates, or groupings, making dispersion of the CNSs difficult. Carbon enhanced reinforcement ("CER") fibers help improve the dispersibility of CNSs. CER fibers comprise CNSs grown in situ on fiber substrates, or otherwise affixed, adhered, bonded, or attached to fiber substrates.

Various methods have been developed for growing CNSs on fiber substrates, or otherwise affixing, adhering, bonding or otherwise attaching CNSs to fiber substrates to form carbon enhanced reinforcement (CER) fiber. The CNSs grow radially outward from the fiber substrates in a random and structurally entangled manner, forming a percolated network as they grow. Percolation is the formation of well connected pathways of conductive media. The CNSs may remain directly bonded to the individual fiber substrates throughout processing, such that the fibers act as a scaffold to assist in dispersing CNSs throughout a dispersion media. By grafting or otherwise bonding or adhering individual CNSs to the fibers, the CNSs are pre-dispersed over the surface of the fiber substrate. If the CNSs are not adhered to a substrate, the attractive forces of the CNSs tend to cause the CNSs to agglomerate. It is believed that growing the CNSs on the substrate, or otherwise tethering, grafting, bonding the CNSs to the substrate, aids in the dispersion of the CER in a media and thereby the overall formation of a percolated network. It is believed that including the CNS directly on a fiber substrate tends to reduce the tendency of the CNSs to aggregate and clump together. Nevertheless, it is desirable to further improve and control the dispersability of CER fiber.

In some exemplary embodiments, the method further includes agitating the whitewater solution and CNSs or CER fibers, to form a thoroughly dispersed CNS or CER slurry.

In some exemplary embodiments, the whitewater solution includes a dispersion medium comprising water, mineral oil, and/or hexane. In some exemplary embodiments, the whitewater solution includes a surfactant package, which, may include one or more nonionic or ionic surfactants.

In some exemplary embodiments, the method further includes aerating the whitewater solution. In other exemplary embodiments, the free CNSs or the CNSs on the CER fibers are functionalized.

In some exemplary embodiments, a nonwoven CNS or chopped CER mat is formed by the exemplary methods described above.

The general inventive concepts include a method for forming a nonwoven chopped CER mat. In some exemplary embodiments, the method includes adding chopped CER fibers into a whitewater solution contained in a mixing tank. The CER fibers are then agitated in the whitewater solution, creating a slurry of thoroughly dispersed CER fibers. The slurry may be passed into a second mixing tank, where the slurry is again agitated. The slurry is then passed onto a porous conveyor belt system, forming a CER fiber web. A binder is applied to the web and the web is dried, forming a nonwoven chopped CER mat.

In some exemplary embodiments, the whitewater solution includes a dispersion medium comprising water, mineral oil, and/or hexane. In some embodiments, the whitewater solution further includes a surfactant package, which may include one or more nonionic or ionic surfactants.

In some exemplary embodiments, dispersing the CER fibers is accomplished by aerating the whitewater solution.

In some exemplary embodiments, dispersion of the CER fibers is accomplished by functionalizing the free CNSs or the CNSs on the CER fibers.

The general inventive concepts further include a method for forming a CNS nonwoven mat that includes forming one or more CER fibers comprising a plurality of CNSs disposed on a fiber substrate, passing one or more CER fibers through a whitewater solution contained in a mixing tank, coating the CER fiber with said whitewater solution, and passing the whitewater solution coated CER fiber through a narrow aperture, shearing off one or more of the CNSs into the whitewater solution. The CNSs are then deposited onto a screen by removing the whitewater solution, forming a CNS web and curing said CNS web, forming a nonwoven CNS mat.

The general inventive concepts further include a method for forming a CNS nonwoven mat that includes forming one or more CER fibers comprising a plurality of CNSs disposed on a fiber substrate, passing the CER fiber through a narrow aperture, shearing off one or more of the CNSs into a whitewater solution contained in a mixing tank. The whitewater solution is then removed from the CNS slurry to form a CNS web and the CNS web is cured to form a nonwoven CNS mat.

The foregoing and other objects, features, and advantages of the general inventive concepts will become more readily apparent from a consideration of the detailed description that follows.

BRIEF DESCRIPTION OF THE DRAWINGS

FIG. 5 illustrates a second exemplary process for forming a nonwoven CNS mat.

DETAILED DESCRIPTION

Figure 1B:
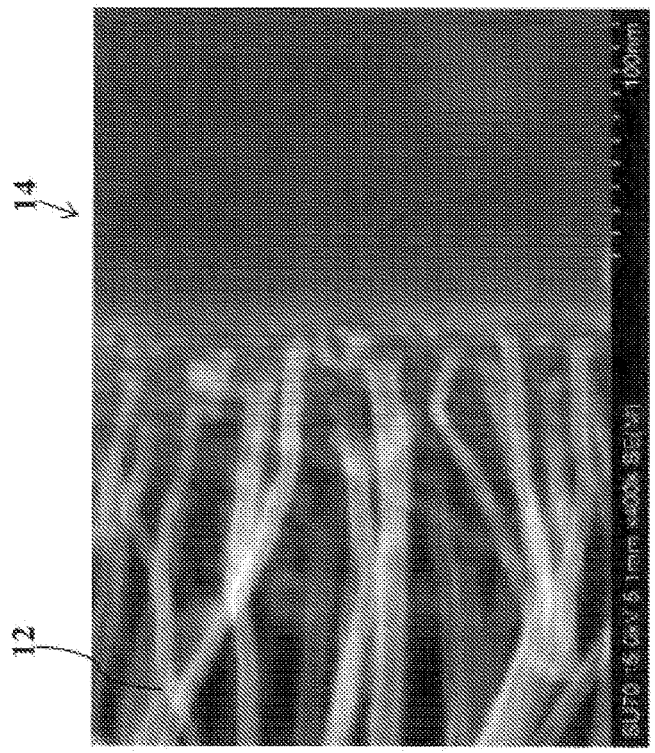
FIGS. 1(a)-(b) illustrate exemplary carbon nanostructures (CNSs) grown on a glass fiber surface.

While various exemplary methods and materials are described herein, other methods and materials similar or equivalent to those described herein are encompassed by the general inventive concepts.

Unless defined otherwise, all technical and scientific terms used herein have the same meaning as commonly understood by one of ordinary skill in the art to which the invention belongs. In this connection, unless otherwise indicated, concentrations of ingredients given in this document refer to the concentrations of these ingredients in the master batch or concentrate, in keeping with customary practice.

As used herein, the terms "sizing agent," "fiber sizing agent," or just "sizing," refer collectively to compositions used in the manufacture of fibers as a coating to protect the integrity of fibers, provide enhanced interfacial interactions between a fiber and a matrix material in a composite, and/or alter and/or enhance particular properties of the fibers.

As used herein, the terms "CER," "CER fiber," and "CER fiber structures" refer collectively to fibers that include carbon nanostructure (CNS) grown in situ on a fiber substrate, or otherwise affixed, adhered, bonded, or attached to the fiber substrate.

In accordance with customary practice, the term "fiber" or "fiber material" refers to any material which has a fibrous structure as its elemental structural component. The term encompasses fibers, filaments, yarns, tows, tapes, woven and non-woven fabrics, plies, mats, and the like.

Additionally, the term "whitewater solution" refers to any aqueous or non-aqueous solution in which fibers are dispersed. The term "whitewater solution" may include a solution that contains any of numerous dispersion mediums, viscosity modifiers, de-foamers, binders, surfactants, biocides, and the like.

The general inventive concepts relate to the controlled dispersion of carbon enhanced reinforcement (CER) fibers in a whitewater solution. The controlled dispersion facilitates stable, homogenous dispersion of CER fibers, measured by the uniformity of the distribution of the CER fibers in a whitewater solution, as well as the ability of the CER fibers to remain dispersed over time. Incomplete dispersion can lead to undesirable alteration in certain fundamental properties of the CER fibers or other detrimental effects. The inventive concepts further relate to the controlled dispersion of CER fibers in a whitewater solution for the formation of a nonwoven chopped CER fiber mat. The thoroughly dispersed, nonwoven chopped CER fiber mat may then be used in connection with a variety of applications, such as 3-D perform, veil applications, etc.

In some exemplary embodiments, the reinforcing fiber making up the substrate of the CER fibers may comprise any conventional material, such as glass fibers, carbon fibers, and the like. In some exemplary embodiments, the fibers may include a hybrid of two or more different types of substrate fibers, such as a mixture of both glass and carbon fibers. When more than one type of fiber is used, each type of fiber may include CNSs, or only one type of fiber may include the CNS, while the remaining types of fibers are free of CNS. Although the reinforcing fibers will be described herein as glass fibers, it is to be appreciated that any conventional reinforcing fiber may be used. The term "reinforcing" means the substrate imparts some beneficial or otherwise desirable property (e.g., increased strength) to another substrate or material. Other reinforcing substrates are also contemplated herein such as woven and nonwoven fabrics, glass spheres, and the like.

The glass may include any type of glass suitable for a particular application and/or desired product specifications, including conventional glasses. Non-exclusive examples of glass compositions include A-type glass fibers, C-type glass fibers, G-glass fiber, E-type glass fibers, S-type glass fibers, E-CR-type glass fibers (e.g., Advantex® glass fibers commercially available from Owens Corning), R-type glass fibers, wool glass fibers, or combinations thereof, which may be used as the reinforcing fiber. In some exemplary embodiments, the glass has both a high Young's Modulus and high tensile strength, and maintains these properties even in the presence of CNS growth and/or related processing. In some exemplary embodiments, the input glass is Advantex® glass, which serves as a low cost, boron free E-glass and E-CR glass reinforcement.

Alternatively, in some exemplary embodiments, the reinforcing fiber may be fibers of one or more synthetic polymers such as polyester, polyamide, aramid, and mixtures thereof. The polymer strands may be used alone as the reinforcing fiber material, or they can be used in combination with glass fibers such as those described herein.

The reinforcing fibers have lengths that vary depending on the particular application desired. In some exemplary embodiments, the chopped fibers have length of approximately 0.1-2 inches, and particularly about 0.25 inch. The chopped fibers may have uniform lengths, or may include varying lengths within a nonwoven CER fiber mat.

Figure 1A:
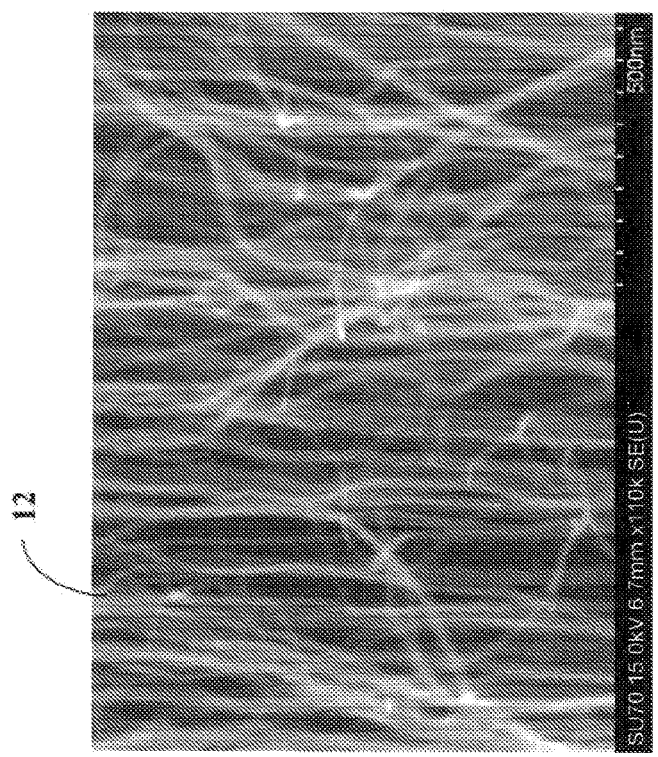
Figure 2B:
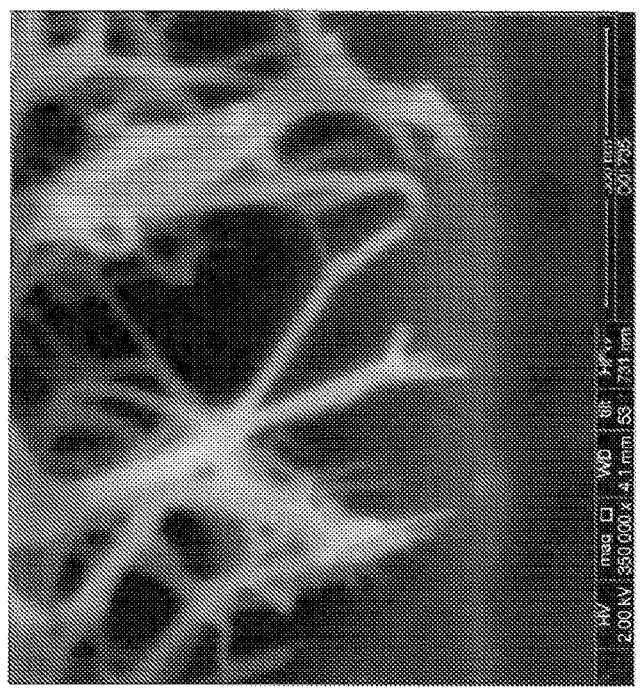
FIGS. 2(a)-(b) illustrate the growth of CNSs directly on a fiber surface substrate.
Figure 2A:
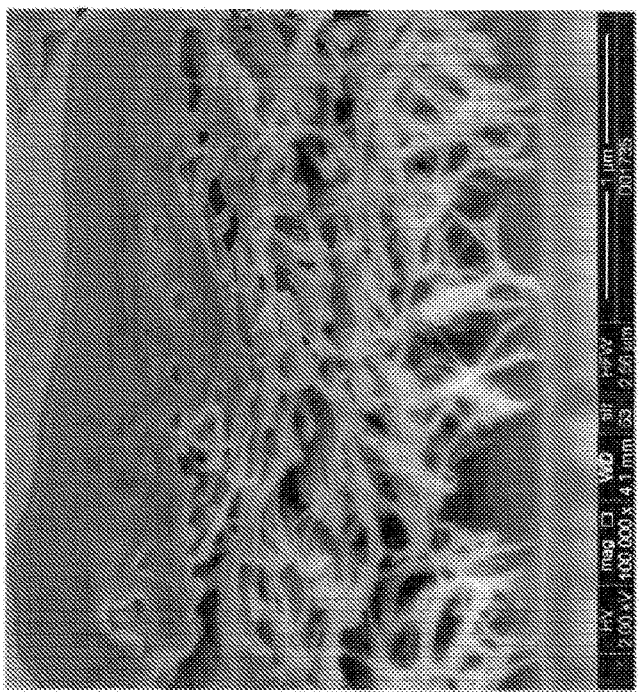

FIGS. 1(a)-(b) illustrate exemplary CER fibers comprising CNSs 12 grown or deposited directly on a glass fiber 14 as highly cross-linked structures. The CNSs 12 grow radially outward from the glass fibers 14 in a random and structurally entangled manner, forming a percolated network as they grow. FIG. 2(a)-(d) illustrates the branching and cross-linking that may occur in and among the individual CNSs 12 on glass fibers, forming a highly entangled network. In some exemplary embodiments, the CNS branching may stem from the placement of catalyst particles that deposit on individual CNTs. Such branching may include base growth branching, wherein the branching generally occurs at the base of the CNT, medium growth branching, wherein the branching generally occurs at a point along the length of the CNT, or tip growth branching, wherein the branching generally occurs at the tip of an existing CNT.

In some exemplary embodiments, the CNS loading on the fiber may be between about 2-45%. In some exemplary embodiments, the CNS loading may be between about 10-30% loading on the fiber, and preferably about 20%. The CNS loading levels may be adjusted to "tune" the properties of the resulting CER fiber and the product produced therefrom. For example, when the resulting CER fibers are utilized in making nonwoven chopped CER fiber mats, the loading levels of the CNS on the fiber may be tuned to impact the properties of the fiber mats. For example, the amount of total CNS in the resulting nonwoven mat will typically affect the mechanical, thermal, electrical, and physical properties of the mat.

As is to be appreciated, homogenous dispersion of CER fibers in a whitewater solution generally requires that the CER fibers be spread (with generally uniform number density) throughout the whitewater solution. Since the CNSs generally remain adhered to the individual fibers, the fibers act as a scaffold to help disperse the CNSs throughout the whitewater solution. However, due to the strong van der Waals forces, or other interactions between the CNS, the CNSs on chopped CER fibers have an affinity to agglomerate and form bundles often with highly entangled networks. Typically, the higher the CNS loading on the CER fibers, the stronger the attraction among neighboring CER fibers.

Figure 3:
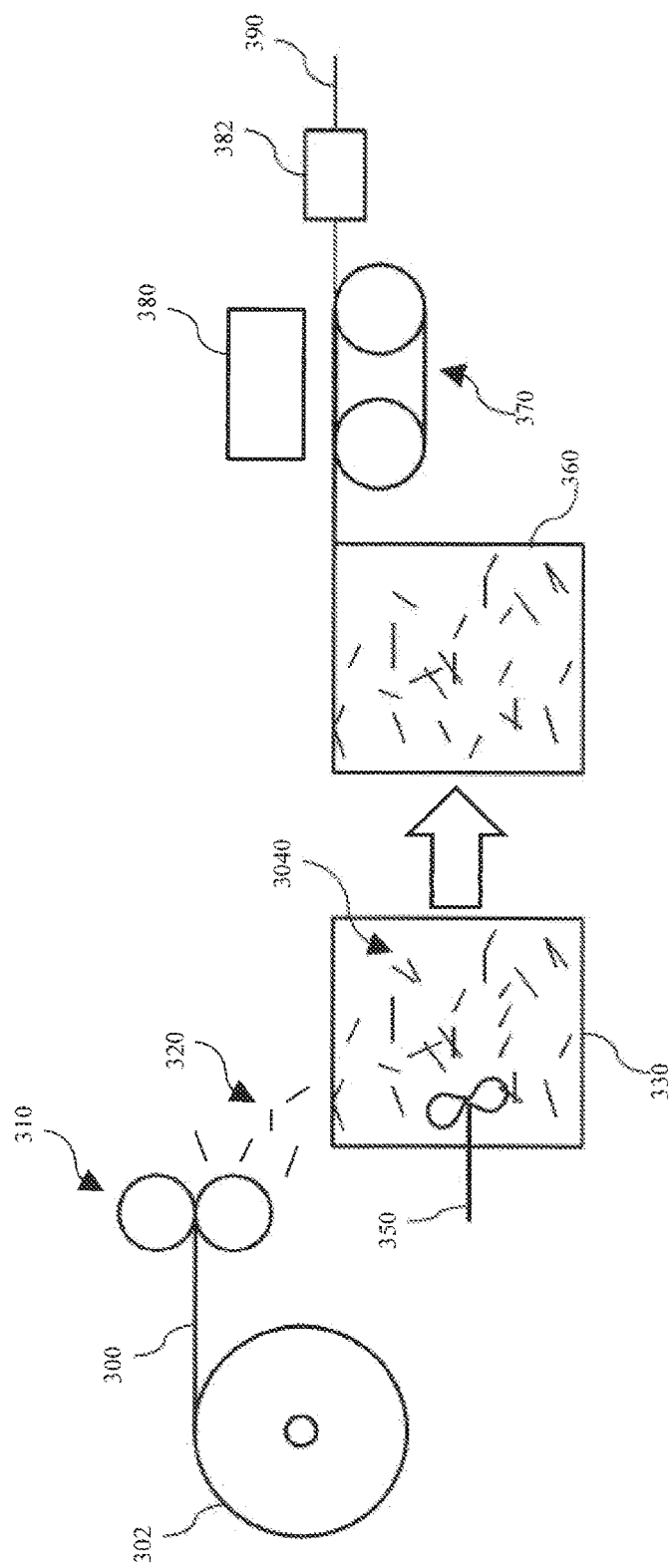
FIG. 3 illustrates an exemplary process for forming a nonwoven CER mat.

Referring to FIG. 3, an exemplary process of forming a nonwoven CER mat according to one embodiment of the present invention is illustrated. In the exemplary embodiment illustrated in FIG. 3, CER fiber 300 from a CER fiber package 302 is chopped using a conventional chopping device 310 to form chopped CER fiber 320. The chopped CER fiber 320 are added to a mixing tank 330 containing a whitewater solution 340. The use of chopped CER fiber 320 in this manner assists in creating a controlled, generally homogenous dispersion of CER fibers within the whitewater solution. In some exemplary embodiments, the whitewater solution 340 comprises an aqueous or non-aqueous dispersion medium and one or more of film formers, coupling agents, binders, viscosity modifiers, and additives, such as, for example, lubricants, surfactants, anti-oxidants, and plasticizers Optionally, the whitewater solution 340 may further include defoaming agents and other chemical agents, such as biocides and also foaming agents, such as amine oxide surfactant systems.

The type of viscosity modifier used is application driven, and may be anionic or cationic. Commonly, the viscosity modifier is anionic. In some embodiments, the viscosity modifier is a polymer, such as, but not limited to a water soluble polymer, such as an acrylic polymer. Such acrylic polymers may include a polyacrylamide, such as Drewfloc 270.

Exemplary film formers may include, but are not limited to waxes, polyethylene glycols, polypropylene glycols, polycaprolactones, glycidyl ethers, epoxy resins, urethanes, polyester alkyds, amic acid, propylene glycol fumarate, propoxylated bisphenol-A-maleate, propoxylated allyl alcohol-maleate, polyvinyl acetates, olefins, surfactants, maleated polypropylene, low molecular weight polyesters and mixtures thereof. Particularly, in some exemplary embodiments, the film former includes one or more of a polyurethane, such as Hydrosize® U6-01 and/or Baybond® PU 401; polypropylene; polyethylene glycol ester, such as PEG 400 MO; polyvinylpyrrolidone (PVP), such as PVP K-15, PVP K-30, PVP K-90, PVP K-60, and PVP K-120; and epoxy resin, such as EPI-REZ™ 3511. Additionally, the film former may include one or more surfactant, such as a nonionic surfactant (i.e., Triton X-100), for example. The coupling agent may comprise any coupling agent desired for a particular application. In some exemplary embodiment, the coupling agent may include one or more of alcohols, amines, esters, ethers, hydrocarbons, siloxanes, silazanes, silanes, lactams, lactones, anhydrides, carbenes, nitrenes, orthoesters, imides, enamines, amines, amides, imides, functionalized olefins and mixtures thereof. Particularly, in some exemplary embodiments, the coupling agent is a silane selected from one or more of KBM-602 (N-(-aminoethyl)--aminopropylmethyldimethoxysilane), (gamma-2-aminoethylamino)propyl methol dimethoxysilane, aminopropyldiethoxysilane, gamma-aminopropyltriethoxysilane (A1100), gamma-glycidoxypropyltrimethoxysilane (A-187) and 3-methacryloxypropyltrimethoxysilane (A-174).

As stated above, the whitewater solution 340 may include additional various additives. In some exemplary embodiments, the whitewater solution 340 includes a curing agent. The curing agent may comprise dicyandimide (DICY), which is a known curing agent for epoxy resins. In some exemplary embodiments, the whitewater solution 340 may further include adhesives, such as, for example, an ethylene-vinyl acetate copolymer emulsion (i.e., Airflex® 410). The whitewater solution 340 may further include polyvinylfonnaldyde/polyvinylamine or copolymers, which may be obtained from various sources, including Lupamin® 9095, 9050, 9000, 5095, and 1500, for example.

The whitewater solution 340 may further include surfactants, such as, for example, non ionic surfactants. Exemplary nonionic surfactants may include long chain alcohols, polyoxyethylene glycol alkyl ethers, polyoxypropylene glycol alkyl ethers, glucoside, alkyl ethers, polyoxyethylene glycol alkylphenol ethers, glycerol alkyl esters, polyoxyethylene glycol sorbitan alkyl esters, sorbitan alkyl esters, polyethoxylated tallow amine, cocamide DEA, cocamide MEA, dodecyldimethylamine oxide, poloxamers, polyethyl eneamine polyimide salts, ethoxylated acetylenic diols, and octylphenoxypolyethoxyethanol.

In some exemplary embodiments, the whitewater solution 340 comprises one or more of a film former, a coupling agent, and optional additives. In some exemplary embodiments, the whitewater solution 340 comprises from about 70 to about 99 weight percent film former, about 1 to about 30 weight percent coupling agent and about 0 to about 20 weight percent of optional additives. In other exemplary embodiments, the whitewater solution 340 includes about 80 to about 90 weight percent film former, about 10 to about 20 weight percent coupling agent, and about 0 to about 10 weight percent additive.

Additionally, in some exemplary embodiments, a binder is included in the whitewater solution 340. The binder may include, for example, an acrylic or acrylate binder, a styrene acrylonitrile binder, a styrene butadiene rubber binder, a urea formaldehyde binder, or mixtures thereof.

In some exemplary embodiments, the CER fibers are mixed with agitation, such as by mechanical agitation, to form a chopped CER fiber slurry. Referring again to FIG. 3, the chopped CER fibers 330 in the illustrated exemplary embodiment are agitated within the whitewater solution 340 by an optional mechanical agitation device 350. Mechanical agitation methods may include simple stirring with a spatula, agitation with an agitating blade, a magnetic stirrer, an agitation pump, and other mechanical agitation methods. Traditionally, free CNTs are not fully dispersible without additional dispersion means, such as sonification and/or the use of a tapered tube. During sonification, one or more pulses are used to break apart CNT bundles. The use of a tapered tube increases the velocity of the slurry, causing the CNTs to shear and also imparts energy into the system. However, the use of CER fibers allows for dispersion to occur within a currently practiced dispersion process without any updates or addition of costly dispersion means, such as the aforementioned sonification and tapered tube devices, to the system, although such dispersion means may nonetheless be used.

In some exemplary embodiments, the whitewater solution 340 may comprise an aqueous or non-aqueous dispersion medium, which may include, for example, water, hexane, or oil, such as mineral oil and other lower molecular weight type oils. If the dispersion medium comprises mineral oil or hexane, dispersion of the CER fibers may occur upon agitation with no or minimal help from an additional dispersion means. This is because oil and hexane are both non-polar substances and therefore generally compatible with the non-polar CNSs on the CER fibers. This is because generally, two materials that have similar intermolecular forces will be soluble in each other. For example, non-polar materials will generally mix and dissolve in non-polar materials. Additionally, mineral oil has a high viscosity which facilitates the dispersion of the CER fibers and also helps lower the surface tension of the whitewater solution, contributing to the dispersion of CER fibers.

Typically, when CER fibers are dispersed in water and mechanically/physically agitated, the CER fibers float on the top of the water, since the non-polar CER fibers are not soluble in highly polar water. The non-polar, hydrophobic surfaces of the CNSs make dispersion of the CER fibers in traditional whitewater solutions difficult. Accordingly, the CER fibers are generally unable to realize complete dispersion without the inclusion of additional materials to improve the fiber's solubility in polar and/or water-based solutions.

In certain exemplary embodiments, particularly when the dispersion medium is aqueous, the whitewater solution 340 will additionally include a surfactant package, to help disperse and stabilize the CER fibers. As is well understood, surfactants are usually amphiphilic molecules, meaning that they possess both polar and non-polar portions. The polar portion exhibits a strong affinity to polar solvents, particularly water, and the non-polar portion exhibits a strong affinity to the non-polar CNSs of the CER fibers. Due to this dual affinity, surfactants tend to migrate to the interface of immiscible solutions and orient themselves in such a way that the polar groups interact with water and the non-polar groups interact with the non-polar portion of a solution.

The amount of surfactant needed to effectively disperse CER fibers within a dispersion medium will vary depending on a variety of factors, such as the surfactant's composition, the dispersion medium, the chemical make-up of the CNSs on the CER fibers, the total surface area of the CER fibers to be dispersed, and the desired degree of dispersion. The amount of surfactant added will affect the stability of the dispersion. The term "stability" refers to the ability of the dispersed CER fibers to remain dispersed in solution over time without aggregation or clumping. Additionally, the surfactant to CER ratio may determine the degree of dispersion. Often, a certain degree of clumping is desired for some applications. Therefore, by changing this surfactant to CER ratio, the degree of dispersion may be controlled.

The surfactant package may include one or more surfactants. In some exemplary embodiments, the surfactants included within the package comprise nonionic surfactants; however, a mixture of nonionics and ionics may be used in various embodiments. The surfactants selected should be soluble or dispersible in the particular dispersion medium used in the whitewater solution. In some exemplary embodiments, the surfactants included comprise those of the ethylene oxide family, such as alkyl phenoxy polyethylene oxide alcohol, and acetylenic alcohols. Examples of surfactants that may be included in the surfactant package, include:

a) Surfynol 465® (ethoxylated 2,4,7,9-tetramethyl-5-decyne-4,7-diol)

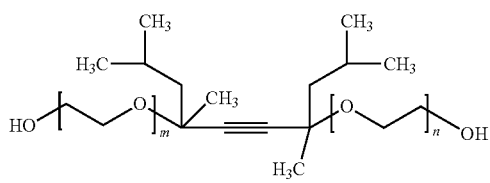

b) Nanosperse AQ:

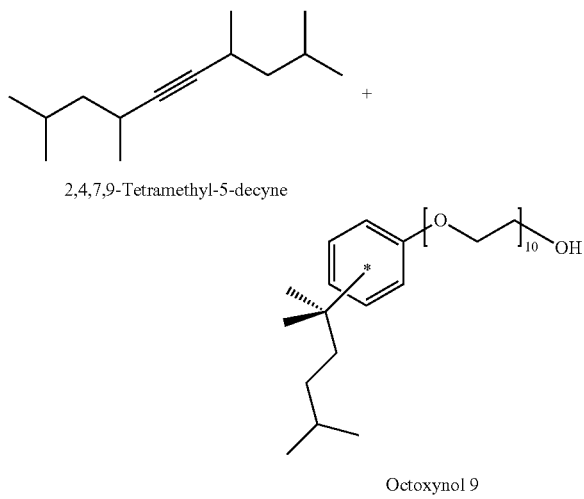

2,4,7,9-Tetramethyl-5-decyne

Octoxynol 9 c) Triton X-100® by Dow Chemical (4-octylphenol polyethoxylate)

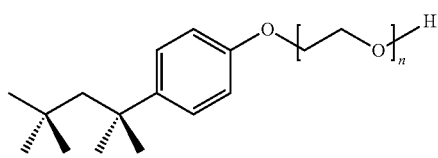

d) Tetronic® 90R4 (ethylenediamine tetrakis(ethoxylate-block-oropxylate) tetrol, and

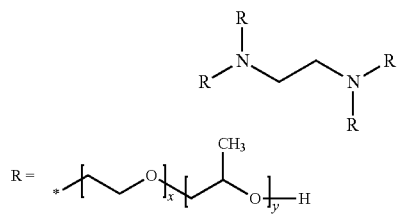

e) Pluronic® 10R5 (Poly(propylene glycol)-block-poly(ethylene glycol)-block-poly(propylene glycol)

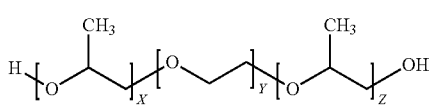

f) Polyvinyl alcohol:

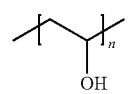

Surfynol® 465 is a nonionic surfactant that comprises two hydrophilic heads connected by a molecular segment and two hydro-phobic tails. Surfynol® surfactants are formed by reacting various amounts of ethylene oxide with acetylenic diol. Triton® X-100 is a nonionic surfactant that has a hydrophilic polyethylene oxide group and a hydrocarbon lipophilic or hydrophobic group. Triton® X-100 is formed from octylphenol polymerized with ethylene oxide and includes an average of 9.5 ethylene oxide units per molecule, with an average molecular weight of 625 g mol$^{-1}$. Tetronic® 90R4 is a tetrafunctional block copolymer surfactant with a terminal secondary hydroxyl group. Pluronic® 10R5 is a di-functional block copolymer surfactant with terminal secondary hydroxyl groups. Nanosperse AQ is a commercially available surfactant package that is a blend of anionic/nonionic dispersions. Polyvinyl alcohol is a water-soluble polymer Although not to be bound by theory, the surfactants function by adsorbing onto the surface of the CNSs. The surfactants contain a hydrophobic portion that surrounds the CNS on the CER fibers providing a means for isolating and dispersing the fibers. The hydrophobic portion of the surfactant interacts with the CER/CNS interface, creating a layering effect by incorporating hydrophobic layers of CER fibers within the whitewater solution. The layering effect allows for controlled, thorough dispersion of the CER fibers throughout the whitewater. The surfactants also lower the surface tension of the liquid and the interfacial tension between different phases of liquids within the whitewater solution.

The dispersion ability of a particular surfactant package is determined by its hydrophyllic-lipophilic balance (HLB), which measures the degree to which it is hydrophilic or lipophilic. If a surfactant package has a low HLB number, it is more lipophilic and there is less contribution from the hydrophilic portion, which provides for more wetting of the CNS. If the HLB is high, the surfactant package experiences a higher contribution from hydrophilic portion and less wetting of the CNS. Accordingly, if increased wetting is desired, the concentration of a low HLB surfactant package will need to be increased. For example, Surfynol 465 has an HLB of 13.0 and Triton X-100 has an HLB of 13.4. HLB, which means that these surfactants will effectuate more thorough dispersion than the same amount of Tetronic 90R4, with an HLB value of (1.0 to 7.0).

Controlled dispersion of the CER fibers in the whitewater solution may additionally or alternatively be accomplished by aeration of the whitewater solution. In some exemplary embodiments, aeration of a whitewater solution is achieved by foaming the whitewater solution (such as by mechanical agitation or the injection of air into the whitewater solution) either as the CER fibers are being added to the mixing tank or after the CER fibers have been added. The foam may comprise a regular air make-up, including nitrogen and oxygen. The oxygen in the foam is hydrophobic, which will interact strongly with the CNS on the CER fibers, such that the CER fibers will adhere to the bubbles in the foam, thus dispersing the CER fibers throughout the whitewater solution. Aeration of the whitewater solution may occur independently as a dispersion means, or in conjunction with a surfactant system.

Additionally, or in the alternative, the surface of CNSs may be chemically or physically functionalized to overcome the insolubility of the CNS in polar solutions. Functionalization includes the attachment of certain molecules or functional groups to the surface of the CNSs. Functionalization of the CNS surfaces may be perpetuated by interacting various additives with the CNS prior to the addition of the CER fibers into the whitewater solution, or the additives may be introduced directly into the whitewater solution. Functionalization enhances the solubility of the CER fibers in solvents and protects against agglomeration by adding functional groups onto the surface of the CNS. If a CNS surface is modified through functionalization, the interaction between the nanostructure and the surroundings is affected and specific types of functional groups may influence the interaction in different ways.

In some exemplary embodiments, functionalizing the surface of the CNSs occurs by grafting a surfactant to the surface of the CNSs. The surfactant and CNSs become a single structure, rather than separate parts. In some exemplary embodiments, functionalization occurs by incorporating oxidizing agents, such as potassium persulfate, potassium permanganate, peroxides, ozone, peroxides, corona discharge, hydrogen, organic peroxides, and MCPD (3-monochloropropane-1,2-diol). The oxidation agents react with the CNS and oxidize different atoms on the surface of the CNS, creating polar areas that will more easily disperse in non-polar medium. This partial oxidation of the CNS modifies the structures from being hydrophobic to being a more compatible hydrophilic, thereby dispersing more easily.

Additionally, in some exemplary embodiment, the CNSs may be acid treated by introducing carboxylic acid groups on the surface of the CNSs, which leads to stabilization in polar solvents. The acids may include piranha solutions (mixture of sulfuric acid and hydrogen peroxide) and other strong acids.

EXEMPLARY METHOD

As described above, although one or more of the reinforcing fibers described herein may be used in producing the CER fibers, it is to be noted that the exemplary methods described herein include reinforcement fibers that are a single type of glass fiber. As is known in the art, glass fiber may be formed by attenuating streams of a molten glass material through a heated bushing to form substantially continuous glass fibers. The continuous fibers are bundled together according to known bundling or packaging methods to form a fiberglass roving or other package, which can in turn be used in the inventive method.

At any time during the fiber forming process, the fibers may be coated with a chemical (i.e., size) composition. Alternatively, the fibers may be coated with a catalytic composition that includes a catalyst. In some exemplary embodiments, a size/catalyst composition may be applied to the fibers that includes one or more of the size ingredients described above, as well as a catalyst. The catalyst may take on any form, including a solid, liquid, gas, and the like. The size/catalytic composition may be applied to the fibers by any method suitable for the desired CER growth, including kiss roll, dip-coat, slide, or spray application to achieve the desired amount of catalytic composition on the fibers.

In one exemplary method, a fiberglass roving coated with the size/catalytic composition enters the CER growth processing stage, such that CNSs are grown directly (i.e., in situ) on the surface of the input fiberglass strand, or otherwise affixed, adhered, bonded, or attached to fiber substrates. The CER growth processing stage is carried out in a growth chamber and includes various steps that may occur in various sections of the growth chamber. The growth chamber may comprise a single continuous chamber, or it may comprise multiple, connected sub-chambers.

In the exemplary method, the glass fibers emerge from the growth chamber with a coating of CNS, thus forming a CER fiber. The CER fibers may then be chopped, forming chopped CER fibers for further processing into a nonwoven CER fiberglass mat using the exemplary methods described herein. Alternatively, the CNSs may be harvested from the CER fiber for use in forming a CNS nonwoven mat using the exemplary methods described herein.

Referring again to FIG. 3, in one exemplary process for forming a CER nonwoven mat, a whitewater solution 340 is prepared in a mixing tank 330 equipped with an optional mechanical agitation device 350. As described above, the particular components of the whitewater solution will vary depending on desired properties and applications. In some exemplary embodiments, the whitewater solution includes an aqueous or non-aqueous dispersion medium and a viscosity modifier, with optional additions of defoaming and biocide agents. Generally, if the CNSs perform biocide and/or defoaming functions, separate defoaming agents, biocides, and other chemical additives may be unnecessary and left out of the whitewater solution. When the dispersion medium is an aqueous liquid, such as water, a surfactant package may be included to facilitate and control CER fiber dispersion.

Once the whitewater solution is mixed, a plurality of chopped CER fibers 320 are added into the whitewater and agitated until the CER fibers are thoroughly dispersed, forming a chopped CER fiber slurry. At anytime during the formation of the chopped CER fiber slurry, the dispersion may be optionally aerated by the introduction of natural air bubbles or foam. The CER fibers adhere to the air bubbles, causing the CER fibers to further disperse within the slurry.

In some exemplary embodiments, the chopped CER fiber slurry is passed into a second mixing tank, known as a constant level chest, and agitated to further disperse the fibers within the whitewater. The constant level chest works similarly to a water tower, in which the elevation of the water creates pressure for delivering the slurry to a conveyor system for forming a nonwoven. Optionally, the slurry may undergo aeration in the constant level chest. The aeration of the slurry may be done in addition to the aeration in the first mixing tank, or may be the only occurrence of aeration in the system.

Referring again to FIG. 3, the chopped CER fiber slurry is then passed into an optional head box 360 where the slurry is randomly deposited onto a porous conveyor 370 as a web. The CER fiber slurry may be transferred from the mixing tank to the optional head box 360 and from the optional head box 360 to the conveyor 370 using any number of conventional transferring methods. Excess water is removed from the web vis-a-vis one, or a series of optional vacuums 380 or other moisture removal devices, to form a CER fiber web. A binder is then applied to the web and the binder-coated web is then passed through an optional drying oven 382 to remove any remaining water and to cure the binder, forming a nonwoven chopped CER fiberglass mat 390. The binder may be an acrylic or acrylate binder, a styrene acrylonitrile binder, a styrene butadiene rubber binder, a urea formaldehyde binder, or mixtures thereof. As the nonwoven chopped CER fiberglass mat reaches the end of the conveyor, the mat may be rolled over an optional tension roller (not shown) to roll the mat for later use.

Figure 4:
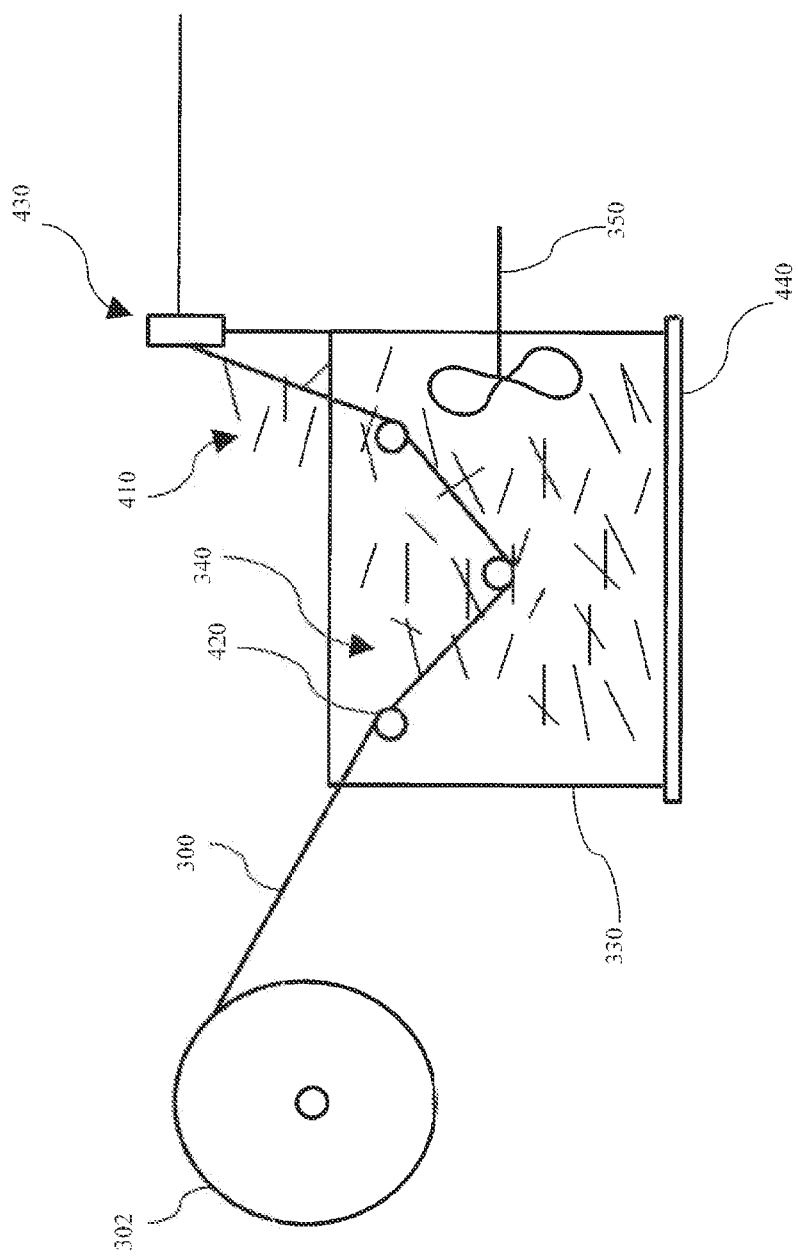
FIG. 4 illustrates an exemplary process for forming a nonwoven CNS mat.
Figure 6A:
FIG. 6(a) illustrates an exemplary beaker including a CER fiber slurry.
Figure 6B:
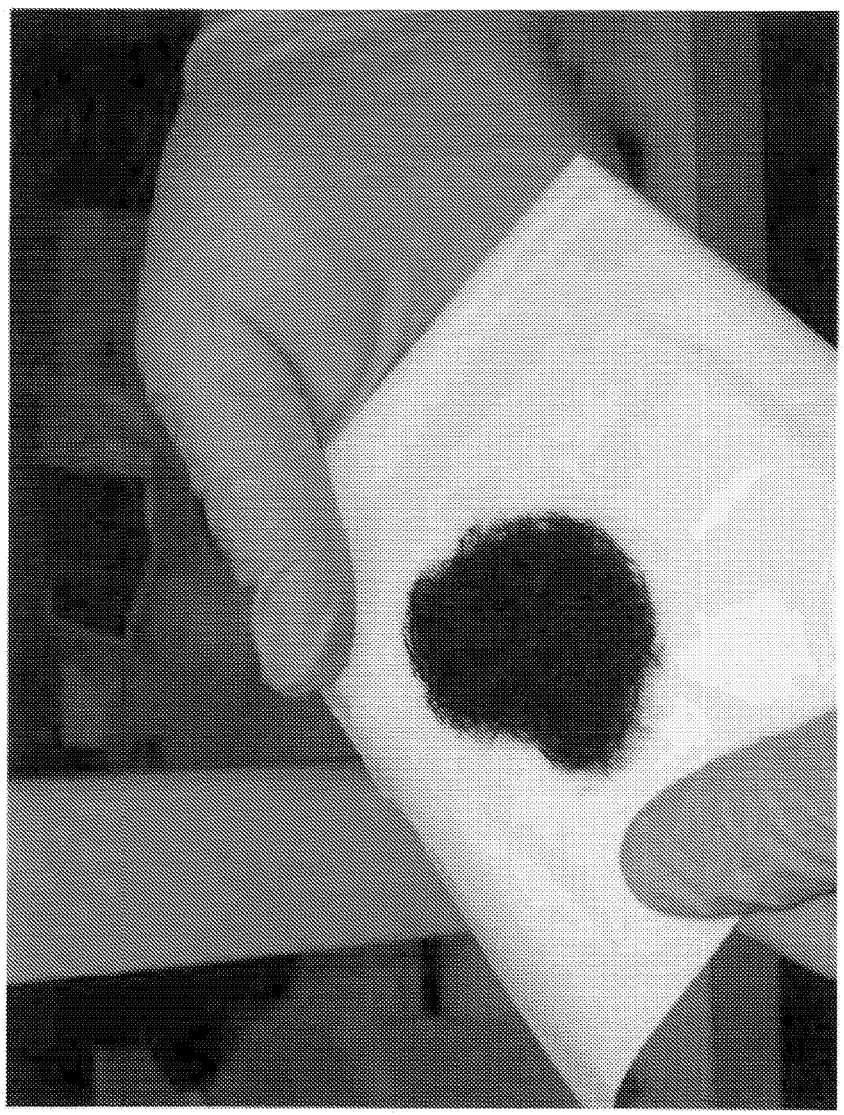
FIG. 6(b) illustrates the CER fiber slurry of FIG. 6(a) poured out on a paper wipe.

The general inventive concepts also relate to the controlled dispersion of CNSs in a whitewater solution. In various additional exemplary embodiments, rather than dispersing chopped CER fibers as a whole, the CNSs may be harvested from the surface of the CER fibers and dispersed directly into a whitewater solution. The process of harvesting CNSs may include various harvesting techniques. Referring to FIG. 4, in one exemplary embodiment of a process for forming a nonwoven CNS mat, CNSs 410 may be harvested by passing one or more CER fiber 300 pulled from a CER fiber package 302 through a mixing tank 330 including a whitewater solution 340 (utilizing one or more rollers 420 or other device to submerge the CER fiber 300 in the whitewater solution 340). The CER fiber 300 are then pulled through a stripper die 430, or other apparatus having a narrowed aperture, to remove the CNSs 410 from the CER fiber 300. In some exemplary embodiments, one CER fiber 300 is passed through the stripper die 430 at a time. In various additional embodiments, a plurality of CER fibers may be passed through the stripper die together at the same time.

As the CER fiber 300 passes through the stripper die 430, CNSs 410 may be sheared off or otherwise removed from the CER fiber 300 and collected back into the whitewater solution 340 in the mixing tank 330. The stripper die 430 may be located either inside or outside of the whitewater solution 340 in the mixing tank 330. In some exemplary embodiments, the whitewater solution includes an aqueous or non-aqueous dispersion medium and one or more of film formers, coupling agents, viscosity modifiers, and additives, such as, for example, lubricants, surfactants, anti-oxidants, and plasticizers. Additionally, in some exemplary embodiments, a binder is included in the whitewater solution. The binder may include, for example, an acrylic or acrylate binder, a styrene acrylonitrile binder, a styrene butadiene rubber binder, a urea formaldehyde binder, or mixtures thereof. It should be understood that the entirety of the previous discussion regarding the whitewater solution and various dispersion techniques and methods in connection with the dispersion of CER fibers is also applicable to the dispersion of CNSs harvested from CER fibers.

As the CNSs 310 drop into the whitewater solution 340, the CNSs may substantially remain in the interconnected, branched form. Such interconnectedness assists the CNSs in dispersing within the whitewater solution 340, creating a CNS slurry. The CNSs 410 within the slurry may be further dispersed by any of the methods described above, such as, for example, mechanical agitation. In the exemplary process illustrated in FIG. 4, the CNSs 410 are agitated within the mixing tank 330 by optional mechanical agitation device 350. Such additional dispersion methods may be performed in the whitewater solution 340 in the mixing tank 330, or the CNS slurry may be passed into an optional second mixing tank for the carrying out of further optional dispersion process steps.

In the exemplary process illustrated in FIG. 4, the whitewater solution 340 is held in a mixing tank 330 that includes an optional screen 440 positioned at the bottom of the mixing tank, such that as the solution 340 is drained from the tank, the CNSs 410 are deposited on the screen in a dispersed manner. Alternatively, the screen may be located in a second mixing tank, if any secondary dispersion methods are used. The CNSs 410 deposited on the screen 440 may then be passed through an oven (not shown) or other curing device, to cure the binder that has been coated on the CNSs while in the whitewater solution, to form a CNS nonwoven mat. In other exemplary embodiments, a binder is applied to the CNSs after the CNSs have been deposited on the screen, either as an alternative to, or in addition to, adding the binder to the whitewater solution. In various embodiments, the CNSs are cured while still on the screen, although in various additional embodiments, the CNSs are removed from the screen prior to curing.

In various additional embodiments, the CNSs may be removed from the CER fiber without first passing the CER fiber through the whitewater solution. For example, in the exemplary process illustrated in FIG. 5, CNSs 410 are sheared off or otherwise removed from CER fiber 300 by passing the CER fiber 300 through a stripper die 430 and collected into a mixing tank 330 including a whitewater solution 340, without the CER fiber 300 first passing through or being coated with the whitewater solution 340. The CNSs 410 may then be dispersed and a CNS nonwoven mat may be formed using any of the method previously described herein.

In some exemplary embodiments, the CNS nonwoven mats are electrically conductive and useful in applications benefiting from such conductivity, resulting in improved EMI shielding effectiveness (SE) and/or electrostatic dissipation (ESD). In some embodiments, the EMI SE is between about 20 and 100 dBs over a frequency range between about 10 kHz and 40,000 MHz and thicknesses between 0.005 and 1 inch.

In some exemplary embodiments, the composite material has an EMI SE between about 40 and 100 dBs over a frequency range between 30 and 2000 MHz at thicknesses between 0.005 and 1 inch.

Having generally described various exemplary embodiments of the general inventive concepts, a further understanding thereof can be obtained by reference to certain specific examples illustrated below which are provided for purposes of illustration only and are not intended to be inclusive or limiting unless otherwise specified.

Example 1

Figure 7B:
FIG. 7(b) illustrates a CER fiber slurry comprising CER fibers, water, and Triton® X-100 poured out on a paper wipe.

In a small beaker, approximately 20 pieces of 0.25 inch chopped CER fibers, including about 17.5% CNS loading, were added to about 30 ml of a solution. Five different solutions were tested: water, mineral oil, hexane, water+Surfynol® 465, and water+Triton® X-100. The beaker was shaken to disperse the CER fibers throughout the solution. FIG. 7(a) illustrates an exemplary beaker including a solution and the CER fibers after the beaker was shaken. The solution was then poured out on a paper wipe, as shown in FIG. 7(b). The CER fibers that deposited on the paper wipe were then dried, removed from the screen as nonwoven mats, and analyzed for the quality of dispersion. No dispersion was seen in the water solution.

Figure 7D:
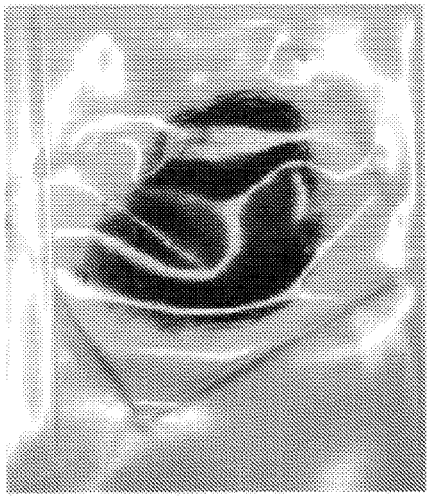
FIG. 7(d) illustrates a CER fiber slurry comprising CER fibers, water, and mineral oil poured out on a paper wipe.
Figure 7A:
FIG. 7(a) illustrates a CER fiber slurry comprising CER fibers, water, and Surfynol® 465 poured out on a paper wipe.
Figure 7C:
FIG. 7(c) illustrates a CER fiber slurry comprising CER fibers, water, and hexane poured out on a paper wipe.

The results of the remaining solutions are illustrated in FIGS. 7(a)-(d). Particularly, FIG. 7(a) illustrates the dispersion of CER fibers in water+Surfynol® 465, FIG. 7(b) illustrates the dispersion of CER fibers in water+Triton® X-100, FIG. 7(c) illustrates dispersion of CER fibers in hexane, and FIG. 7(d) illustrates dispersion of CER fibers in mineral oil.

Example 2

Nonwoven CER fiber mats were prepared by adding about 20 pieces of 0.25 inch chopped CER fibers, including about 17.5% CNS loading, into 30 ml of a whitewater solution contained in a mixing tank. The CER/whitewater solution was mechanically agitated to disperse the CER fibers within the whitewater, forming a slurry. The slurry was then poured into a beaker-in-beaker apparatus, consisting of a large beaker with a small beaker turned upside down on the inside base of the beaker, such that the base of the small beaker extended vertically inside the large beaker.

A medium size beaker, having a hole cut into the bottom of the beaker and a screen disposed over the hole-cut bottom, was then positioned on the base of the second beaker and the slurry was poured over the screen in the third beaker. After the slurry was poured into the beaker-in-beaker formation, the third beaker was pushed down over the base of the second beaker, such that the screen remains resting on the base of the second beaker. The screen was then pulled out with CER fibers disposed thereon, forming a CER fiber web on the screen. The screen and CER fiber web were partially dried using a paper wipe and/or vacuum to remove excess solution. The nonwoven mat was removed from the screen and analyzed for dispersion. The specifics of each trial are listed below.

Figure 8C:
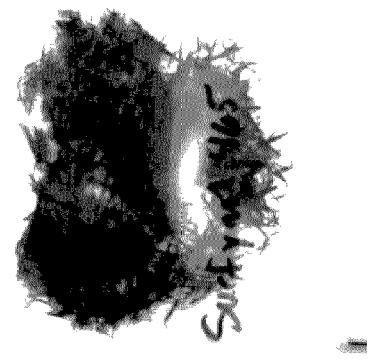
FIG. 8(c) illustrates a CER fiber web formed from a slurry including 3 grams CER, water and Surfynol® 465 according to the process of Example 2.
Figure 8F:
FIG. 8(f) illustrates a CER fiber web formed from a slurry including 3.5 grams CER, water and Triton® X-100 according to the process of Example 2.
Figure 8B:
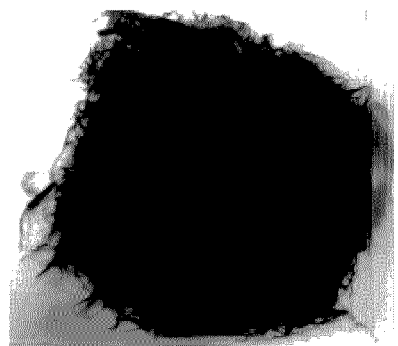
FIG. 8(b) illustrates a CER fiber web formed from a slurry including 3.5 grams CER, water and Tetronic® 90R4A according to the process of Example 2.
Figure 8E:
FIG. 8(e) illustrates a CER fiber web formed from a slurry including 1 gram CER, water and Pluronic® 10R5 according to the process of Example 2.
Figure 8A:
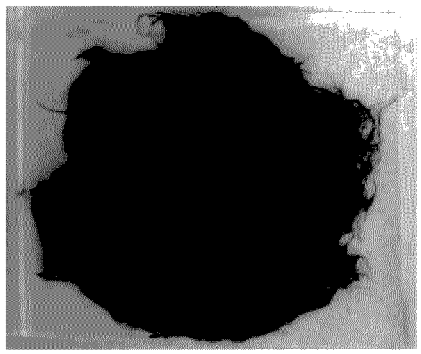
FIG. 8(a) illustrates a CER fiber web formed from a slurry including 5.6 grams CER, water and Tetronic® 90R4A according to the process of Example 2.
Figure 8D:
FIG. 8(d) illustrates a CER fiber web formed from a slurry including 0.6 grams CER, water and Surfynol® 465 according to the process of Example 2.

The above-described process was repeated using various surfactants in a whitewater solution. In a first trial, 5 ml of Surfynol® 465 was mixed with 750 ml deionized water. To this mixture, 3 grams of 0.25 inch chopped CER fibers having about 17.5% CNS loading were added. The dispersion results are illustrated in FIG. 8(c). It was determined that 3 grams of CER fiber was too much, so the Surfynol® 465 trial was repeated, but included about 1/5 of the CER fiber material, or 0.6 grams. The dispersion results are illustrated in FIG. 8(d).

The process was then repeated using Pluronic® 10R5 as a surfactant. Specifically, 10 ml Pluronic® 10R5 was added to 750 ml of deionized water. To this solution, about 1 gram of CER fiber with about 17.5% CNS loading was added. The results are illustrated in FIG. 8(e).

The process was repeated again, this time by adding 10 ml Tetronic® 90R4A to about 700-750 ml deionized water. This solution was used in two trials; one incorporated 5.6 grams of CER fiber with about 17.5% CNS loading and one incorporated 3.5 grams of CER fiber with about 17.5% CNS loading. The results of each trial are illustrated in FIGS. 8(a) and (b), respectively.

The above process was once again repeated, including a solution of about 10 ml Triton® X-100 and about 700-750 ml water deionized. To this solution, about 3.5 grams of CER fibers having about 17.5% CNS loading were added. The dispersion results are illustrated in FIG. 8(f).

Generally, the solutions incorporating Surfynol® 465, Pluronic® 10R5, and Tetronic® 90R4 each demonstrated thorough dispersion of the CER fibers. The solution that included Triton® X-100 also demonstrated good dispersion; however, the solution became foamy.

Example 3

Hexane Dispersant

The use of hexane as a dispersion medium was compared to dispersion in water by incorporating about ¼ inch chopped CER fibers, having about 17.5% CNS loading into two mixing tanks. The first mixing tank consisted of water and the second mixing tank included hexane. When the CER fibers were mixed with the water, the fibers floated to the top and would not disperse even when pushed down with a plastic eyedropper. Although when worked with the eyedropper the CER fibers separated into smaller bundles, the fibers would nonetheless float to the top of the mixing tank. In contrast, when the CER fibers were added to the hexane solution, the fibers sank to the bottom of the mixing tank and dispersed when agitated with the eye dropper. The hexane easily wets the CNSs since hexane is very hydrophobic and thus compatible with the CNS on the CER fibers. 5 ml of Surfynol® 465 was then added to both the water and hexane mixing tanks. When added the water tank, the CER fibers sank and could be worked into smaller bundles and dispersed when agitated with a plastic eyedropper. The use of Surfynol° lowers the surface tension of the water, making it "wetter" and more compatible with the CER fibers. Wetting is the ability of a liquid to maintain contact with a solid surface, resulting from intermolecular interactions when the two are brought together. The degree of wetting (wettability) is determined by a force balance between adhesion and cohesive forces. Additionally, when the Surfynol® 465 was added into the hexane tank, the CER fibers dispersed more thoroughly. However, the triple bond portion of the Surfynol® 465 structure is compatible with hexane, and will tend to fall out of the solution, causing the solution to became cloudy. As more hexane is added, the solution becomes continuously more cloudy, which is caused by an incompatibility which indicates that the Surfynol® may not be compatible with the hexane.

Example 4

Harvesting CNS

Figure 9:
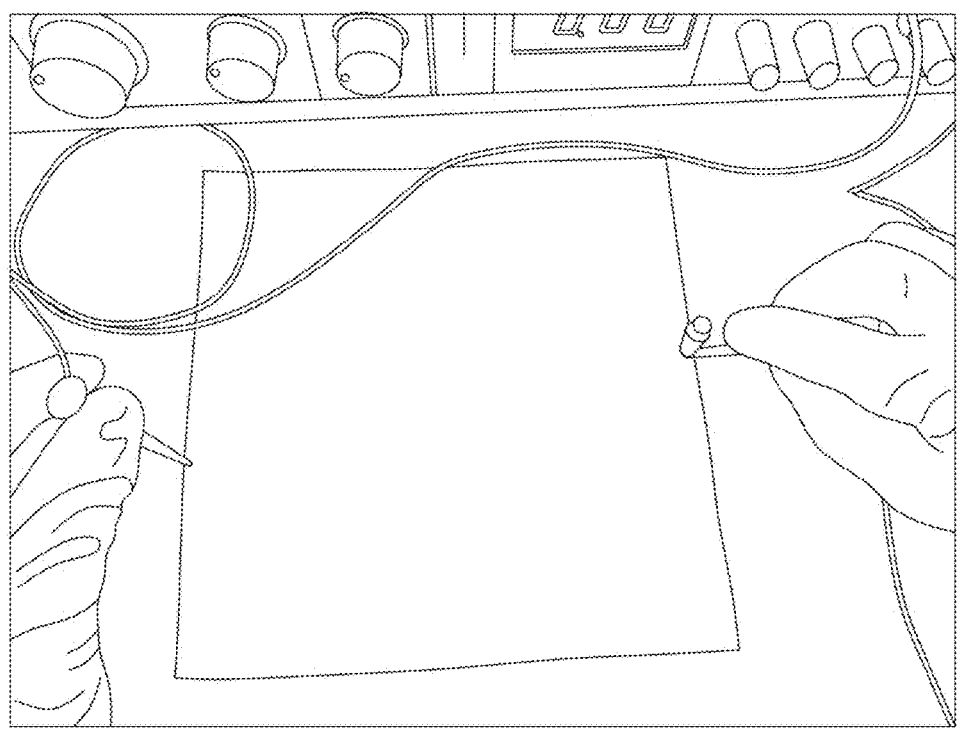
FIG. 9 illustrates an exemplary nonwoven CNS mat.

Nonwoven CNS mats were prepared by passing a series of individual CER fibers through a whitewater solution bath comprising an aqueous dispersion medium, a binder, and a viscosity modifier. As previously described herein, the CER fibers were then passed through a stripper die. As the CER fibers passed through the die, CNSs were sheared off and collected back into the whitewater solution bath. The CNS/whitewater solution was then introduced into a secondary mixing tank, which included a screen positioned at the bottom of the tank. The whitewater solution was drained from the tank, causing the CNSs to be deposited on the screen, forming a CNS web. The CNS web was then cured, forming a CNS nonwoven mat, as illustrated in FIG. 9.

Figure 10:
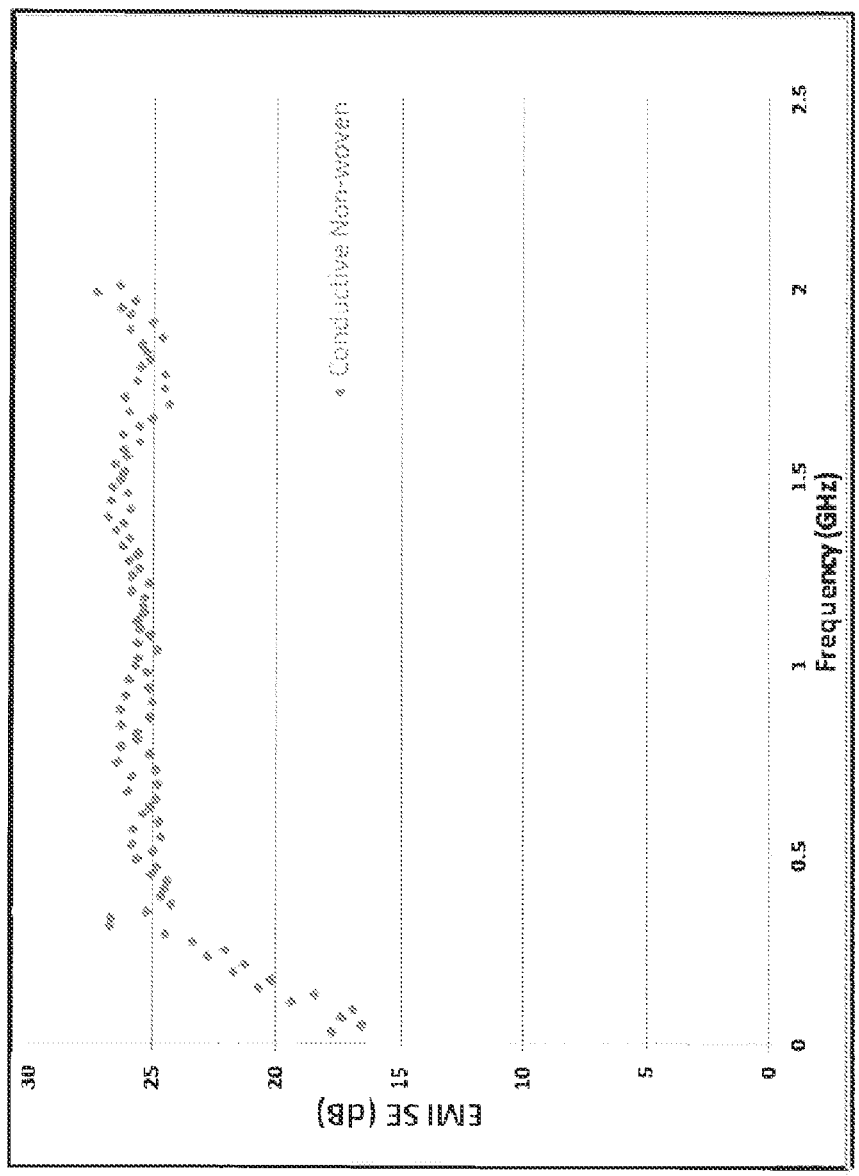
FIG. 10 illustrates the EMI conductivity and resistivity of the exemplary nonwoven CNS mat illustrated in FIG. 9.

The exemplary CNS nonwoven mat formed was 0.0065 inches thick. The mat was tested for EMI conductivity and resistivity. As illustrated in FIG. 10, the EMI shielding efficiency (dB) increased from about 17 dB to about 26 dB with increasing frequencies between about 0 and 0.5 GHz. The shielding effectivenss leveled off at about 26 dBs at frequencies higher than 0.5 gHz. The CNS nonwoven mat demonstrated a bulk resistivity of $2.7\times10^5$ Ω*cm and a surface resistivity of $4.6\times10^2$ Ω*cm.

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within the generic disclosure.

It will be understood that various changes may be made without departing from the scope of the invention, which is not to be considered limited to what is described in the description. While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Therefore, the inventive concept, in its broader aspects, is not limited to the specific details, the representative apparatus , and illustrative examples described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions--such as alternative materials, configurations, methods, devices and components, alternatives as to form, fit and function, and so on--may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated. The general inventive concepts are not otherwise limited, except for the recitation of the claims set forth below.

The invention claimed is:

1. A method of controlling the dispersion of carbon enhanced reinforcement fibers in an aqueous or non-aqueous solution, said method comprising:
    forming one or more carbon enhanced reinforcement fibers comprising a plurality of carbon nanostructures disposed on a fiber substrate;
    chopping said carbon enhanced reinforcement fibers to form chopped carbon enhanced reinforcement fibers; and
    forming a slurry by adding a plurality of said chopped carbon enhanced reinforcement fibers into a whitewater solution,
    wherein said whitewater solution comprises at least one of (i) an oil dispersion medium, (ii) a viscosity modifier, (iii) a biocide, (iv) a de-foaming agent, and (v) a surfactant package, and
    wherein said carbon enhanced reinforcement fibers are homogenously dispersed in said slurry.

2. The method of claim 1, wherein said carbon enhanced reinforcement fibers comprise a plurality of carbon nanostructures grown in situ on a fiber.

3. The method of claim 1, wherein said whitewater solution comprises an oil dispersion medium and a surfactant package.

4. The method of claim 3, wherein said surfactant package comprises at least one non-ionic surfactant.

5. The method of claim 3, wherein said surfactant package comprises at least one of Surfynol® 465, Nanosperse AQ, Triton® X-100, Tetronic® 90R4, Pluronic® 10R5, and polyvinyl alcohol.

6. The method of claim 3, wherein said surfactant package comprises at least two surfactants.

7. The method of claim 1, further comprising aerating said whitewater solution.

8. The method of claim 1, wherein said carbon nanostructures are functionalized to enhance the solubility of the carbon enhanced reinforcement fibers in the aqueous or non-aqueous medium.

9. The method of claim 8, wherein said carbon nanostructures are functionalized by interacting the carbon nanostructures with an oxidizing agent.

10. The method of claim 8, wherein said oxidizing agent comprises at least one of potassium persulfate, potassium permanganate, peroxides, and ozone.

11. The method of claim 1, wherein said fiber substrate is formed from at least one of glass, carbon, polymer, woven fabric, and nonwoven fabric.

12. The method of claim 11, wherein said fiber substrate comprises glass.

13. The method of claim 1, wherein said carbon enhanced reinforcement fibers include 10-20% by weight carbon nanostructure loading.

14. The method of claim 1, wherein said oil dispersion medium is mineral oil.

* * * * *